(12) United States Patent
Pawlik

(10) Patent No.: US 12,035,054 B1
(45) Date of Patent: Jul. 9, 2024

(54) COLOR FILTER ARRAY INTERPOLATION FOR RGB-IR IMAGE SENSORS

(71) Applicant: Amazon Technologies, Inc., Seattle, WA (US)

(72) Inventor: Bartlomiej Pawlik, Singapore (SG)

(73) Assignee: Amazon Technologies, Inc., Seattle, WA (US)

( * ) Notice: Subject to any disclaimer, the term of this patent is extended or adjusted under 35 U.S.C. 154(b) by 312 days.

(21) Appl. No.: 17/547,104

(22) Filed: Dec. 9, 2021

(51) Int. Cl.
| | |
|---|---|
| *G06K 9/00* | (2022.01) |
| *H04N 9/69* | (2023.01) |
| *H04N 23/84* | (2023.01) |
| *H04N 25/13* | (2023.01) |
| *H04N 25/131* | (2023.01) |

(52) U.S. Cl.
CPC .............. *H04N 23/843* (2023.01); *H04N 9/69* (2013.01); *H04N 25/131* (2023.01); *H04N 25/135* (2023.01)

(58) Field of Classification Search
CPC ...... H04N 23/843; H04N 9/69; H04N 25/131; H04N 25/135
See application file for complete search history.

(56) References Cited

U.S. PATENT DOCUMENTS

| | | | | | |
|---|---|---|---|---|---|
| 6,125,201 | A * | 9/2000 | Zador | .................. | H04N 19/186 382/248 |
| 6,343,141 | B1 * | 1/2002 | Okada | .................... | H04N 19/17 375/E7.218 |
| 7,012,643 | B2 * | 3/2006 | Frame | .................. | H04N 25/134 348/E9.01 |
| 7,088,392 | B2 * | 8/2006 | Kakarala | ................. | G06T 3/403 348/222.1 |
| 7,256,828 | B2 * | 8/2007 | Nilsson | ................. | H04N 25/134 382/167 |
| 8,111,299 | B2 * | 2/2012 | Lukac | .................. | H04N 25/134 348/222.1 |
| 8,189,910 | B2 * | 5/2012 | Chan | ..................... | G06T 3/4015 382/167 |
| 10,298,932 | B1 * | 5/2019 | Vitsnudel | ............. | H04N 7/0152 |
| 2006/0152596 | A1 * | 7/2006 | Adams, Jr. | ................ | G06T 5/50 348/222.1 |
| 2010/0310162 | A1 | 12/2010 | Chan et al. | | |

(Continued)

FOREIGN PATENT DOCUMENTS

WO   WO-2018234616 A1 * 12/2018 ........... G06T 3/4015

*Primary Examiner* — Shervin K Nakhjavan
(74) *Attorney, Agent, or Firm* — K&L Gates LLP

(57) ABSTRACT

Techniques are generally described for color filter array interpolation of image data. A first frame of image data representing a plurality of pixels arranged in a grid may be received. A low pass filter may be used to generate a first luminance value for a first non-green pixel of the plurality of pixels. A first chrominance value of the first non-green pixel may be determined based at least in part on a combination of at least a chrominance value of a first green pixel located adjacent to the first non-green pixel and a chrominance value of a second green pixel located adjacent to the first non-green pixel. A second luminance value for the first non-green pixel may be determined based on a combination of the first chrominance value and the first luminance value. Output values for the first non-green pixel may be determined based at least in part on the second luminance value.

22 Claims, 14 Drawing Sheets

(56) References Cited

U.S. PATENT DOCUMENTS

| | | | |
|---|---|---|---|
| 2013/0177242 A1* | 7/2013 | Adams, Jr. | G06T 3/403 |
| | | | 382/167 |
| 2017/0163954 A1 | 6/2017 | Sato et al. | |
| 2020/0112662 A1 | 4/2020 | Sakamoto et al. | |
| 2021/0360142 A1* | 11/2021 | Blanquart | H04N 13/239 |
| 2021/0360179 A1* | 11/2021 | Dangi | G06N 3/045 |

* cited by examiner

Chrominance Interpolation and image formation 600

Constant hue prior 602

$raw(R, G, B, IR) = luminance\ (L) \cdot chrominance\ (C)$ $chrominance\ (C) = \dfrac{raw\ (R, G, B, IR)}{luminance\ (L)}$ $C_{R,G,B,IR} = interp(C)$ $I_{R,G,B,IR} = C_{R,G,B,IR} \cdot L$

OR

Color difference 604

$raw(R, G, B, IR) = luminance\ (L) + chrominance\ (C)$ $chrominance\ (C) = raw\ (R, G, B, IR) - luminance\ (L)$ $C_{R,G,B,IR} = interp(C)$ $I_{R,G,B,IR} = C_{R,G,B,IR} + L$

FIG. 6

COLOR FILTER ARRAY INTERPOLATION FOR RGB-IR IMAGE SENSORS

BACKGROUND

Cameras and other image sensors may be used to capture images and/or videos of a physical environment, sometimes for surveillance or monitoring certain areas of interest. Some cameras include image sensors effective to detect light in both the visible and infrared (IR) spectrums, which enable the operation of those cameras in day and night modes. The photosensors included in image sensors typically detect light intensity with little or no wavelength specificity, preventing the sensors from separating color information in the captured light signal. Color filter arrays (CFAs), which are comprised of a mosaic of color filters, are placed over the pixel sensors of the image sensor to capture a mosaic of color information. However, in a typical CFA implementation, any given pixel has color information for only a single color (corresponding to the color filter associated with that pixel in the CFA). CFA interpolation techniques (sometimes referred to as "demosaicing") interpolate color information from surrounding pixels to determine a full color image from the incomplete color information output by the image sensor overlaid with the CFA. Demosaicing is typically performed by an image signal processor which may either be included in the digital camera device or may be located remotely.

BRIEF DESCRIPTION OF DRAWINGS

FIG. 6 depicts two example processes that may be used to determine per-pixel chrominance values for each channel, in accordance with various aspects of the present disclosure.

DETAILED DESCRIPTION

Figure 1:
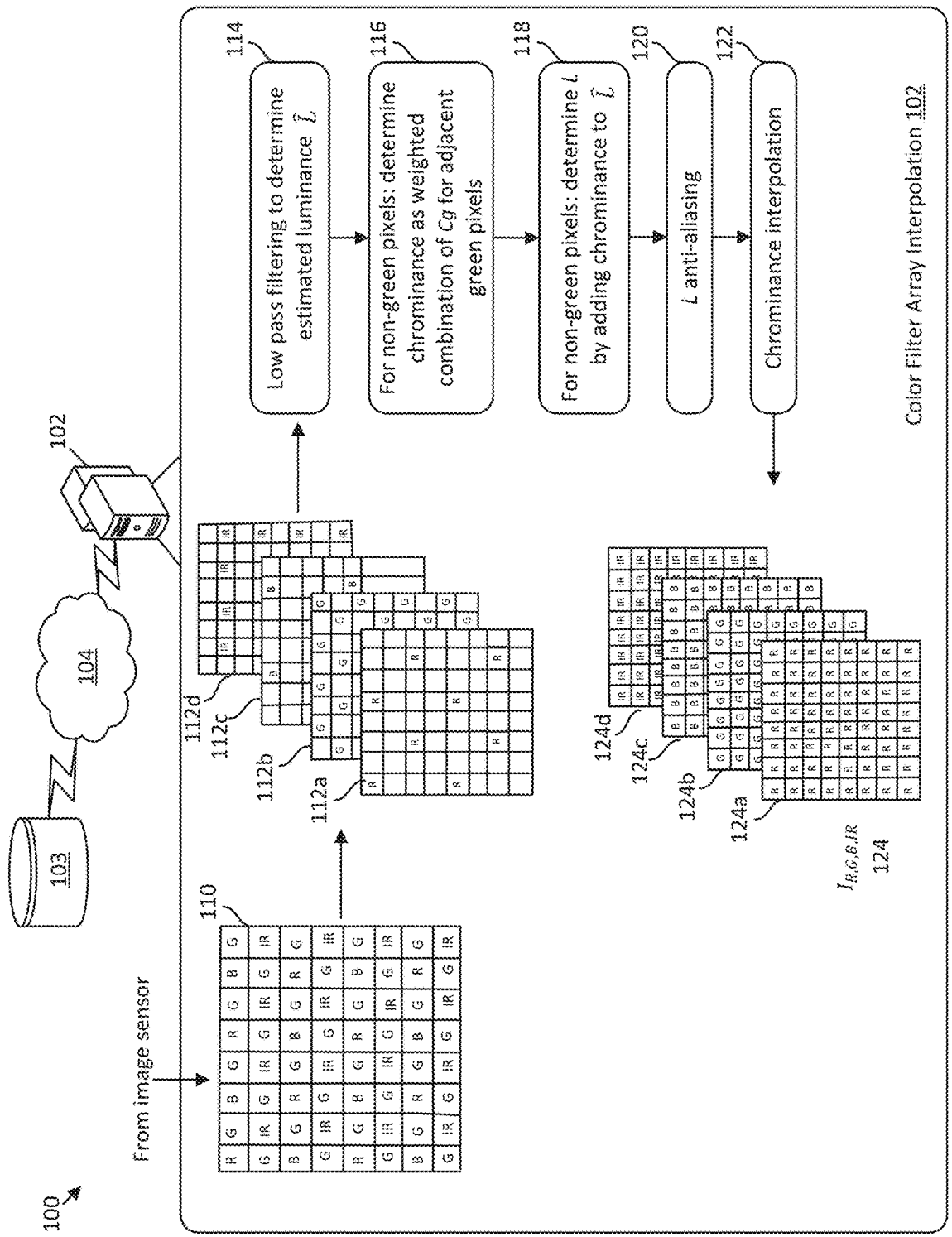
FIG. 1 is a block diagram showing an example color filter array interpolation system, arranged in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In digital cameras, light is focused by one or more lenses (or other optical elements) onto an array of photosensors in an image sensor with each photosensor corresponding to a pixel. The photosensors convert the incoming light (photons) into electrical signals that can be stored, analyzed, and/or used to generate an image on a display. The photosensors of an image sensor are typically arranged in a grid (e.g., a two-dimensional pattern) with photosensors arranged in rows of aligned photosensors and columns of aligned photosensors. Each photosensor corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture. Image sensors are solid state devices. Examples of different types of image sensors include charged couple device (CCD) sensors and complementary metal-oxide semiconductor (CMOS) sensors. In general, a frame of image data refers to any set of image data values that may be considered together for some purpose. For example, each photosensor/pixel of an image sensor may capture individual pixel information. The pixel information may be considered as a group when arranged into a frame of a two-dimensional grid. Each position in the grid may be referred to as a "pixel" and each pixel may be associated with a pixel value that represents the intensity of light captured by the photosensor that corresponds to the pixel. Accordingly, in some examples, a pixel may be represented as a two-dimensional coordinate.

As previously described, the photosensors detect light intensity but, without more, are unable to separate different the intensity information for different wavelengths of light. Accordingly, the photosensors are not able to generate color information from the received light. CFAs include color filters that only allow certain wavelengths of light to pass. A CFA includes a pattern of such color filters where each pixel of the photosensor array corresponds to a single color filter from the CFA. Accordingly, each photosensor receives light that corresponds to a particular color. CFA patterns have been developed to allow for interpolation from surrounding pixels in order to determine color information for all relevant "missing" color channels.

For example, a photosensor may be overlaid with a light filter in the CFA that allows light of wavelengths between approximately 625-740 nanometers (nm) to pass. The pixel corresponding to this photosensor may be referred to as a "red pixel" as this is the approximate wavelength range of red light. Similarly, a pixel associated with a photosensor that is overlaid with a light filter in the CFA that allows light of wavelengths between approximately 435-500 nm to pass may be referred to as a "blue pixel" and a pixel associated with a photosensor that is overlaid with a filter in the CFA that allows light of wavelengths between approximately 520-565 nm to pass may be referred to as a "green pixel." In some examples described herein, photosensors that are sensitive to light in the near infrared range (NIR) may be used. Accordingly, the CFA for such image sensors may include NIR (sometimes referred to herein as "IR") filters that allow light of wavelengths in the infrared range to pass (e.g., from approximately 780-1100 nm). A pixel associated with a photosensor that is overlaid with a filter in the CFA that allows light of wavelengths between approximately 780-1100 nm to pass may be referred to as an "IR pixel" or an "infrared pixel." As used herein, a non-green pixel refers to a blue pixel, a red pixel, or an infrared pixel.

Accordingly, for a CMOS image sensor sensitive to visible light, a traditional approach is to use a Bayer CFA comprised of 2×2 pixel blocks. The first row of such a 2×2 block including a blue pixel and a green pixel and the second row including a green pixel and a red pixel. Accordingly, 50% of the pixels in Bayer CFA are green pixels, while 25% of the pixels are red pixels and 25% are blue pixels. This arrangement is due in part to the physiology of the human eye which is more sensitive to green light relative to red and blue light. Accordingly, the image resulting from the Bayer CFA (sometimes referred to as a "Bayer pattern image"), without additional processing, has green pixels, red pixels, and blue pixels. However, for a given green pixel, no red color information or blue color information is available. Similarly, for a red pixel, no green or blue information is available, and so on. CFA interpolation (demosaicing) can be used to determine the missing colors.

For example, a simple demosaicing algorithm may interpolate the color value of the pixels of the same color in the neighborhood. For example, once the image sensor chip has been exposed to an image, the value of each pixel can be read. A pixel with a green filter provides an exact measurement of the green component. The red and blue components for this pixel may be obtained from the neighbors. For example, for a green pixel, two red pixel neighbors can be interpolated to yield the red value, and two blue pixels can be interpolated to yield the blue value. Such an approach may work reasonable well in areas with constant color or smooth gradients, but it may cause artifacts such as color bleeding in areas where there are abrupt changes in color or brightness (such as along sharp edges or visual transitions in the image).

Typical RGB image sensors allow infrared light to be transmitted onto the red, green, and blue pixels. During daylight, a mechanical infrared "cut" filter is placed in front of the image sensor to filter out infrared light. During night (or dark conditions) the cut filter is removed and a black and white image is generated using the infrared information. However, IR cut filters require mechanical actuation by a small motor. This mechanism increases cost of the device, introduces a potential point of failure, and makes noise during actuation that can be annoying to some users.

Accordingly, in some examples described herein, image sensor/CFAs are described that include some pixels that are only sensitive to infrared light. For example, the traditional Bayer CFA pattern may be modified by replacing certain red or blue filters with IR filters that only allow infrared light to pass. An example of such a CFA pattern is depicted below in FIG. 1 (e.g., input image 110 may be a CFA pattern image resulting from a Bayer CFA modified by replacing certain blue pixels and red pixels with IR pixels, as described above). The IR information from the IR pixels may be used as a reference to "subtract" infrared contamination in the image and/or to better estimate color information in the image (in daytime camera modes). However, because such CFA patterns have fewer red pixels and blue pixels relative to a traditional Bayer pattern, different demosaicing techniques may be used to preserve edges, increase sharpness, and to enhance overall image quality.

FIG. 1 is a block diagram of a system 100 including an example color filter array interpolation system 102, arranged in accordance with various aspects of the present disclosure. In various examples, one or more computing devices that may be configured in communication over a network 104 may implement the color filter array interpolation system 102 that may be used to select and output content based on predicted user intent/user attention. In some examples, the color filter array interpolation system 102 may be implemented in an image signal processor, which may be implemented in a device (e.g., a camera device) or which may be located remotely with respect to a camera device. For example, one or more of the techniques used by the color filter array interpolation system 102 may be performed using an application specific integrated circuit (ASIC) and/or using a field programmable gate array (FPGA). Network 104 may be a communication network such as a local area network (LAN), a wide area network (such as the Internet), or some combination thereof. The one or more computing devices implementing the color filter array interpolation system 102 may communicate with non-transitory computer-readable memory 103 (e.g., either locally or over network 104). Non-transitory computer-readable memory 103 may store instructions that may be effective to perform one or more of the various techniques described herein.

Input image 110 may be captured using an image sensor overlaid with a CFA. As shown, the CFA pattern may include a number of repeating 4×4 pixel blocks. The first (top) row may comprise the pixel color pattern, from left to right: red, green, blue, green. The second row (from top) may comprise the pixel color pattern, from left to right: green, IR, green, IR. The third row (from top) may comprise the pixel color pattern, from left to right: blue, green, red, green. The fourth row (bottom row) may be identical to the second row, comprising the pixel color pattern: green, IR, green IR. In various examples, the particular pixel color pattern may be modified in accordance with a different desired implementation. For example, the color filter array interpolation techniques described herein may be used in similar CFAs where the red pixels and blue pixels are swapped with respect to the pattern shown in FIG. 1. Similarly, in various other examples, the first and third rows may comprise the IR pixels, while the second and fourth rows comprise the red and blue pixels. Accordingly, the CFA pattern (e.g., the pattern of color light filters of the CFA) of the input image 110 is merely one example used for illustrative purposes.

The red pixels of input image 110 are associated with raw "red" pixel values. A raw red pixel value is the R value for the pixel received from a photosensor of the image sensor that is covered with a color filter allowing red light to pass. A raw red pixel is generally accepted as an accurate value for the red channel (e.g., of the R, G, B, IR color channels) due to the red color light filter allowing red light to pass to the photosensor cell that is associated with the red pixel. However, the raw pixel values may be computationally adjusted (e.g., rounded, filtered, amplified, and/or attenuated), as desired. Accordingly, a raw pixel value refers to light intensity information output by a photosensor for a given pixel whether computationally adjusted or not. In the previous example, the red pixel is missing green (G) information, blue (B) information, and infrared (IR) information. Similarly, a given green pixel of input image 110 is associated with a raw "green" pixel value, a given blue pixel of input image 110 is associated with a raw "blue" pixel value, and a given infrared pixel of input image 110 is associated with a raw "IR" pixel value. Raw pixel values may be linear intensity values of the photosensor and may depend on the electrons emitted from each photosensor multiplied by analog gain. In an example, raw pixel values may be represented as 12-bit unsigned integers, although any number of bits may be used depending on the implementation. In some examples, the raw pixel values may be represented as floating point numbers between 0-1.

The input image 110 may be logically decomposed into four separate frames 112a, 112b, 112c, 112d—with one frame for each of the R, G, B, and IR color channels. It should be noted that this operation is for illustrative purposes and may not actually be performed using the color filter array interpolation system 102. Frame 112a represents the pixels associated with raw red pixel values, frame 112b represents the pixels associated with raw green pixel values, frame 112c represents the pixels associated with raw blue pixel values, and frame 112d represents the pixels associated with raw IR pixel values. However, as can be seen by visually inspecting frames 112a, 112b, 112c, 112d, for the top-left red pixel in frame 112a, no green, blue, or IR information is available. Similarly, for any green pixel in frame 112b, there is no red, green, or infrared information. Accordingly, the goal of the color filter array interpolation system 102 is to determine red, green, blue, and infrared color channel information for each pixel of the input image 110 to generate an image that can logically separated into frames 124a, 124b, 124c, and 124d. Accordingly, the goal of the color filter array interpolation system 102 is to generate, for each pixel, a red pixel value (R), a green pixel value (G), a blue pixel value (B), and an infrared pixel value (IR). The R, G, B, IR pixel values (one value for each of the R, G, B, IR color channels) generated using the various techniques described herein may be referred to as output values. Similarly, chrominance (color information for the red, green, blue, and infrared channels) may be represented as floating point numbers (e.g., between 0-1 or using some other representation). Further, luminance (the intensity of light received at a particular photosensor/pixel) may be represented as a floating point number between 0-1 (or using some other representation).

Blocks 114, 116, 118, 120, and 122 describe operations that may be performed in order to determine per-pixel information for each of the R, G, B, and IR channels given an input image 110 (e.g., a CFA pattern image). The operations of blocks 114, 116, 118, 120, and 122 are described in further detail below in reference to subsequent figures. Although not specifically shown in FIG. 1, prior to performing color filter array interpolation (demosaicing) the pixels of the input image 110 may be mirrored along the top, bottom, left, and right borders. The number of pixels to mirror may be computed based on the size of the largest convolution kernel used during demosaicing. One formula for determining the number of pixels to mirror is to divide the largest dimension of the filter by 2 and round down. For example, if a 5×5 convolution kernel is used, 5/2=2.5, so two pixels are mirrored along each border of the input image. Mirroring refers to adding an additional row and/or column of pixels to the image that mirrors the pixel values of the terminal rows/columns. For example, if the last three pixels in a row of the input image (from left to right) are a red pixel and a blue pixel, and two pixels are to be mirrored, the first mirrored pixel (adjacent to the blue pixel) will have a pixel value identical to the blue pixel and the next mirrored pixel will have a pixel value identical to the red pixel. The notion that one pixel is adjacent to another may generally refer to a pixel that is vertically, horizontally, or diagonally next to the subject pixel, without any intervening pixels. However, in some other examples, a frame of image data may be any organization of pixel values (e.g., a set of values represented in a data structure that includes metadata indicating a spatial relationship of the pixel values). Accordingly, in some examples, a pixel may be deemed adjacent to another pixel due to the spatial relationships in the data structure. For example, in some cases, an adjacent pixel may be a pixel that is at least one pixel away from a nearest neighbor pixel.

In various further examples, gamma correction may be performed prior to the operations performed at blocks 114, 116, 118, 120, and 122. It may be advantageous to perform gamma correction prior to these subsequent operations to decompress the signals. Decompressing the input image signals (e.g., the raw filter values) may enable use of smaller convolution filters (which may, in turn, reduce power consumption and/or conserve processing resources). The gamma operation itself is computationally cheap, as the gamma operation may be implemented as a lookup table in an ASIC.

At block 114, raw pixel values of each input pixel may low pass filtered to generate an estimated luminance value L for each pixel. In some examples, the filtering may be performed in the frequency domain using, for example, a Fast-Fourier transform (FFT) to transform the spatial input image 110 (e.g., in the pixel domain) into a frequency representation. Thereafter, a low pass filter may be applied to determine low frequency components of the input signal. However, in other examples, a two-dimensional convolutional filter (implemented using a convolution circuit comprising adders, multipliers, and buffers to store intermediate values) may be used to perform the low-pass filtering operation. In various examples, using a two-dimensional convolutional filter to perform the low-pass filtering operation may be advantageous as there may be no need to transform the input image to the frequency domain. In some cases, this may alleviate the need to have a specialized digital signal processor within the device. In other examples, this may remove the need to perform the FFT for each captured image conserving computation time and power. This may be especially advantageous in battery-operated camera devices.

After determining the estimated luminance value L for each pixel, processing may continue at block 116. At block 116 the chrominance may be determined for each non-green pixel as a weighted combination of green chrominance $C_g$ of green pixels adjacent to the subject non-green pixel. In various examples, the spectral sensitivity of green pixels is higher than that of blue pixels and red pixels. Accordingly, the estimated luminance $\hat{L}$ for green pixels may be accepted as an accurate representation of luminance for green pixels. The chrominance $C_g$ of green pixels may then be determined using:

$$C_g = G_{raw} - \hat{L}$$

where $G_{raw}$ is the raw pixel value for the green pixel. Weights may be determined for each subject non-green pixel using a variety of non-linear filters, as described in further detail below. The weights may be used to calculate the chrominance of each non-green pixel based on a combination of $C_g$ of green pixels that are adjacent to the subject non-green pixel. This is discussed in further detail below in reference to FIGS. 4A and 4B.

Processing may continue at block 118, at which the luminance for each non-green pixel may be updated by adding the originally-estimated luminance $\hat{L}$ (for the subject pixel) to the chrominance value that was adaptively interpolated for the subject pixel to generate an interpolated luminance value. For example:

$$L_{non-green} = \hat{L}_{non-green} + C_{non-green}.$$

Processing may continue at block 120 at which an anti-aliasing filter kernel may be used to filter out high frequency noise in the luminance channel (for all pixels) to determine a final luminance value for all pixels. This filtering may be performed in the spatial domain using a convolution filter or in the frequency domain. However, as described above, performing this anti-aliasing in the spatial domain may be advantageous in terms of power consumption and/or other compute resource usage.

Processing may continue at block 122 at which chrominance interpolation may be performed. As described in further detail below, for a given subject pixel, the chrominance of the color channel that pertains to that pixel (e.g., in the CFA pattern image of input image 110) may be determined using different techniques, depending on whether a constant hue implementation is used or a color difference implementation is used.

In a constant hue implementation, the chrominance C of the color channel of the subject pixel may be determined using:

$$\text{chrominance}(C) = \frac{\text{raw}(R, G, B, IR)}{\text{luminance}(L)}.$$

For example, the chrominance $C_r$ for the red color channel may be determined by dividing the raw pixel value for a pixel of the red color channel (e.g., a pixel in the image sensor that is overlaid with a red light filter in the CFA) by the luminance L (e.g., the final luminance L determined at block 120).

In a color difference implementation, the chrominance C of the color channel of the subject pixel may be determined using:

$$\text{chrominance}(C) = \text{raw}(R, G, B, IR) - \text{luminance}(L).$$

For example, the chrominance $C_{ir}$ for the infrared color channel may be determined by subtracting the luminance L (e.g., the final luminance L determined at block 120) from the raw pixel value for a pixel of the IR color channel (e.g., a pixel in the image sensor that is overlaid with a infrared light filter in the CFA).

Once the chrominance of the color channel pertaining to each pixel is determined, the remaining chrominance values may be interpolated from the surrounding pixels. For example, for a blue pixel in input image 110, the chrominance for the blue channel may be determined by subtracting the luminance (post-anti-aliasing) from the raw blue pixel value. The chrominance for the red, green, and IR channels may be determined by interpolating the chrominance values of pixels neighboring the subject blue pixel. Any desired interpolation techniques may be used. However, it may be advantageous to use a relatively simple interpolation technique, such as bilinear interpolation. Although bilinear interpolation sometimes leads to errors, the human eye is not very sensitive to changes in chrominance. Accordingly, some error in interpolated chrominance is acceptable when the determined luminance has been determined according to the techniques described herein.

After determining the R, G, B, and IR values for each pixel (e.g., as visually represented in frames 124a, 124b, 124c, and 124d) the information may be combined to determine the output image as:

$$I_{R,G,B,IR} = C_{R,G,B,IR} + L,$$

if color difference is used to determine chrominance; or as:

$$I_{R,G,B,IR} C_{R,G,B,IR} \cdot L$$

if a constant hue prior is used to determine chrominance. If gamma was used prior to performing the operation at block 114, gamma may be undone following generation of $I_{R,G,B,IR}$ 124 (e.g., using a lookup table).

Figure 2:
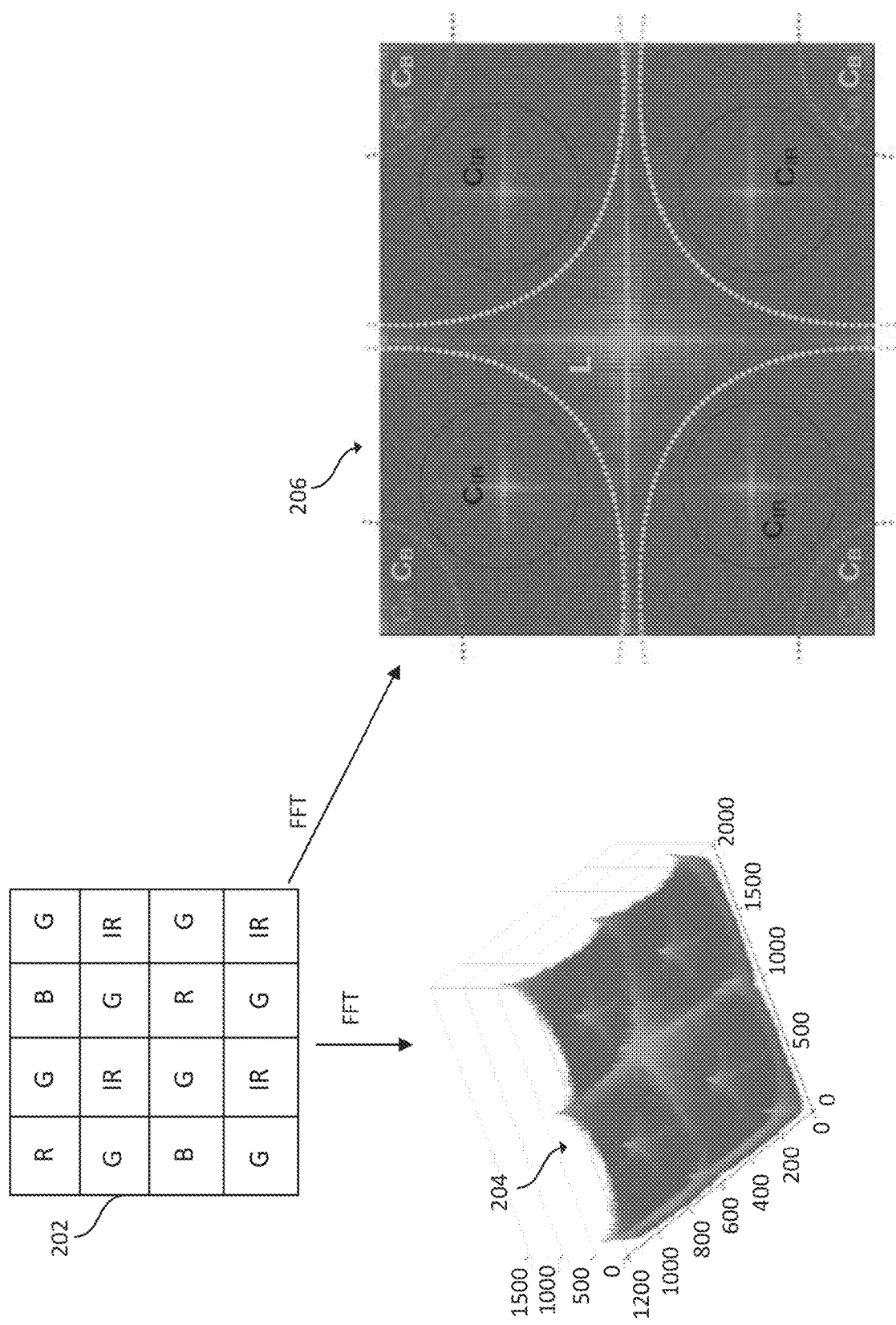
FIG. 2 is a diagram depicting a representation of an input image in the frequency domain, in accordance with various aspects of the present disclosure.

FIG. 2 is a diagram depicting a representation of an input image in the frequency domain, in accordance with various aspects of the present disclosure. Input image 202 is a pattern image output by a CFA that includes red, green, blue, and IR filters. Accordingly, input image 202 comprises red pixels, green pixels, blue pixels, and IR pixels.

A Fast-Fourier transform (FFT) may be used to transform the input image 202 into the frequency domain. The Fourier transform generates a complex number valued output image. The real part of the complex number represents the magnitude of the image in the frequency domain and the imaginary part of the complex number represents the phase. Fourier representations 204 and 206 represent only the real part of the frequency transform and thus represent the magnitude of the image in the spatial domain at different frequencies.

The Fourier representations 204 and 206 are shifted such that the center of representations is the direct current (DC) value at F(0,0). The further away from the center an image is, the higher the corresponding frequency. As can be seen in the Fourier representation 204, there are peaks in the magnitude at lower frequencies, extending along the vertical and horizontal axes away from the center, in the corners at higher frequencies, and in each quadrant of the image. The correspondence between these peaks in magnitude and different luminance/chrominance information is represented in Fourier representation 206.

As shown, most of the Luminance L is represented in a quasi diamond shaped region near the center of the Fourier representation 206 and extending outward vertically and horizontally. The CR and CB information is largely included in the corner regions of the Fourier representation 206, while $C_{IR}$ is largely included in the center of each quadrant of the Fourier representation 206.

The frequency localization of luminance and chrominance signals in the Fourier domain allows for estimation of luminance in the input image 202 by selecting corresponding frequency domains. For example, a relatively accurate representation of luminance L may be determined by low-pass filtering. If interpolation (e.g., bilinear interpolation) is performed on the entire image, interpolation errors in luminance lead to poor image quality (e.g., aliasing, blockiness, grid effect, etc.) because the human eye is sensitive to changes in luminance. However, if the luminance may be accurately estimated and subtracted from the signal, chrominance may be separately interpolated. Errors resulting from interpolation of chrominance do not have the same impact on image quality due to human visual acuity not being as sensitive to changes in chrominance.

Accordingly, if a low pass filter is designed to capture the "diamond-shape" of the luminance channel seen in Fourier representation 206, the luminance may be subtracted and chrominance can be interpolated to generate an output image. However, such filter design is both difficult and impractical. First, the kernel size for such a filter would be large, resulting in a large number of computations, increasing compute time and power consumption. For RGB image sensors, traditional filter designs (e.g., Gaussian filters) may be used for this purpose. However, in cases where the image sensor is sensitive to IR light, the low pass filter design has the added constraint of not filtering out IR information which is closer to the luminance information in the frequency domain. Accordingly, the color filter array interpolation system 102 may use the various techniques described herein to accurately determine luminance information for RGB-IR image sensors. Additionally, while the various filtering operations described herein may be performed in the frequency domain, in some examples, it may be advantageous to instead perform these filtering operations in the spatial domain using two-dimensional convolutions. Performing the filtering operations in the spatial domain avoids the need to perform an FFT (or other Fourier transform) thereby conserving compute time and power usage (and potentially avoiding the need to include an FFT module on device).

Figure 3:
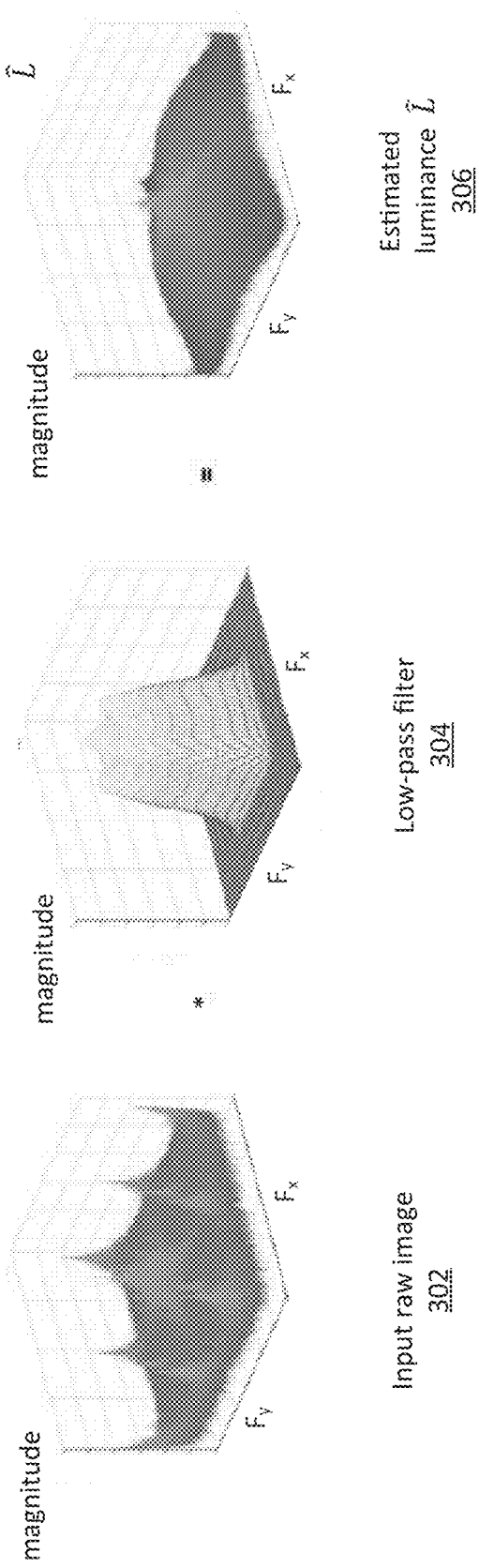
FIG. 3 is a diagram depicting low-pass filtering of an input image in the frequency domain, in accordance with various aspects of the present disclosure.

FIG. 3 is a diagram depicting low-pass filtering of an input image in the frequency domain, in accordance with various aspects of the present disclosure. FIG. 3 depicts an example of low-pass filtering in the frequency domain for ease of illustration. However, as previously described, this filtering operation may instead be implemented in the spatial domain (e.g., the pixel domain) using a two dimensional convolution filter.

The input raw image 302 may be filtered using a low-pass filter 304 to capture the estimated luminance $\hat{L}$ 306. An example of a two-dimensional convolutional filter kernel that may be used to perform the low-pass filter 304 operation may be:

[ 22, −25, −117, −25, 22;
−25, 21, 179, 21, −25;
−117, 179, 806, 179, −117;
−25, 21, 179, 21, −25;
22, −25, −117, −25, 22].

The general expression of a two-dimensional convolution is:

$$g(x, y) = \omega * f(x, y) = \sum_{dx=-a}^{a}\sum_{dy=-b}^{b}\omega(dx, dy)f(x+dx, y+dy),$$

where g(x,y) is the filtered image, f(x, y) is the original image, ο is the filter kernel, and x, y represents coordinates of the pixel space (e.g., of the grid of pixels). Every element of the filter kernel is considered by −a≤dx≤a and −b≤dy≤b.

After the low pass filtering is performed (e.g., using the two-dimensional convolution filter in the spatial domain), the estimated luminance $\hat{L}$ 306 is known for each pixel in the input raw image 302.

Figure 4A:
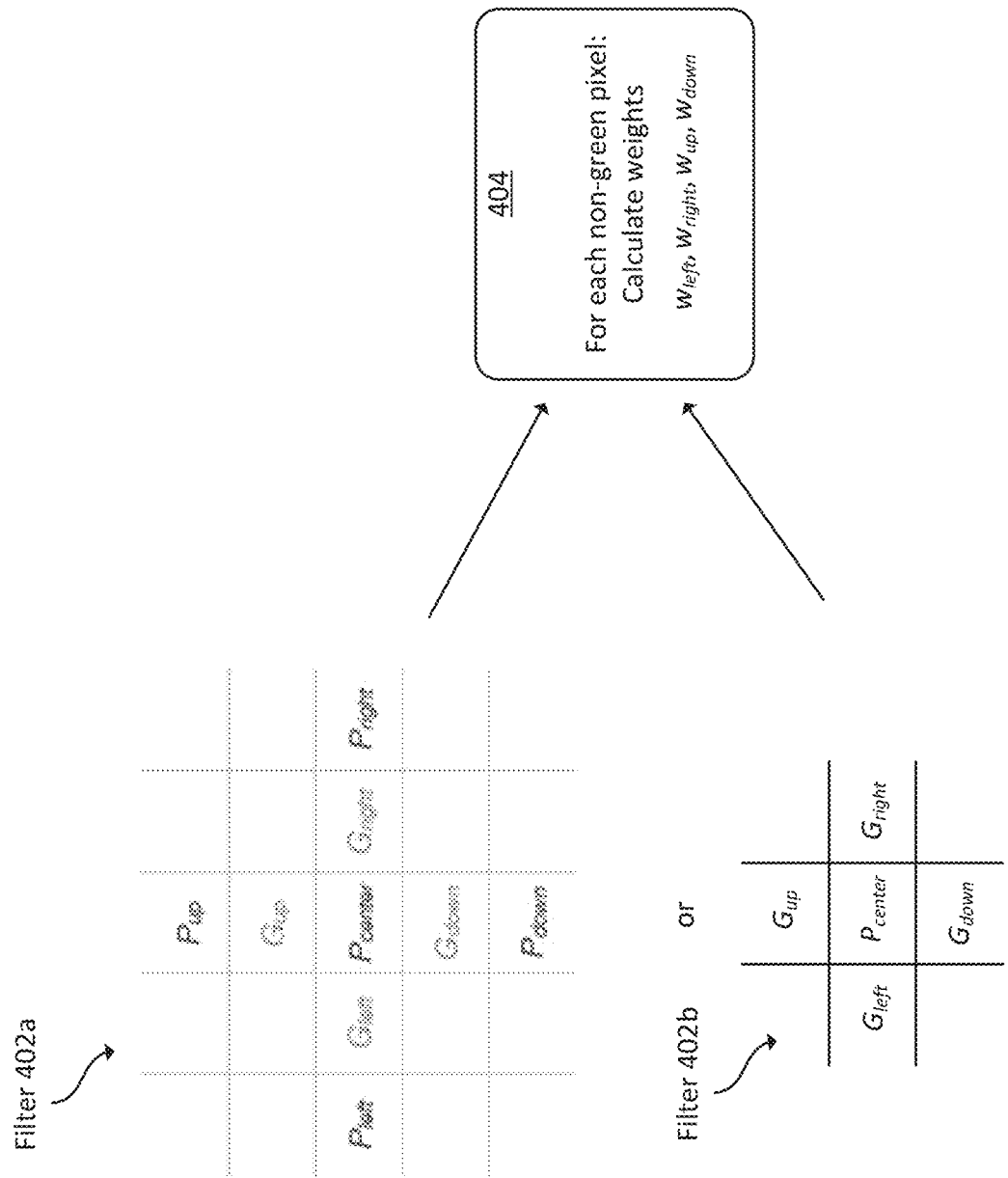
FIG. 4A is a diagram depicting use of two convolution filters that may be used to determine weight values for non-green pixels, in accordance with various aspects of the present disclosure.

FIG. 4A is a diagram depicting use of two non-linear filters that may be used to determine weight values for non-green pixels, in accordance with various aspects of the present disclosure. Filter 402a and filter 402b represent two dimensional non-linear filters that may be used to determine the respective weights $w_{left}$, $W_{right}$, $w_{up}$, and $w_{down}$ (block 404) for adaptively interpolating chrominance for each non-green pixel in the input image. The weights may be determined using raw pixel values output by the CFA/image sensor. In various examples, the luminance of green pixels may be acceptable since the spectral sensitivity of green is broadest and has the most energy relative to the red, blue, and infrared channels. The weight values may be used to preserve edges in the image. For example, without the weight values, interpolation across diagonal edges in an image may lead to undesirable artifacts. The weights $w_{left}$, $W_{right}$, $w_{up}$, and $w_{down}$ are used to assign higher weights to pixels that are more similar to the subject pixel (e.g., $P_{center}$).

In FIG. 4A, $P_{center}$ represents the subject pixel for which the weights $w_{left}$, $W_{right}$, $w_{up}$, and $w_{down}$ are being determined. $G_{left}$, $G_{right}$, $G_{up}$, and $G_{down}$ are the raw pixel values for the green pixels that are to the left, right, above, and below, respectively, the subject pixel $P_{center}$. Similarly, in filter 402a $P_{left}$, $P_{right}$, $P_{up}$, and $P_{down}$ represent the raw pixel values of the non-green pixels located two pixels to the left, two pixels to the right, two pixels above, and two pixels below, respectively, the subject pixel $P_{center}$. The weights $w_{left}$, $W_{right}$, $w_{up}$, and $w_{down}$ may be calculated for filter 402a using:

$$w_{left} = \frac{1}{|P_{left} - P_{center}| + |G_{left} - G_{right}| + \varepsilon},$$

$$w_{right} = \frac{1}{|P_{right} - P_{center}| + |G_{left} - G_{right}| + \varepsilon},$$

$$w_{up} = \frac{1}{|P_{up} - P_{center}| + |G_{up} - G_{down}| + \varepsilon},$$

$$w_{down} = \frac{1}{|P_{down} - P_{center}| + |G_{up} - G_{down}| + \varepsilon},$$

where ε is a small value selected to avoid division by zero. However, when implemented in an ASIC or other IC it should be noted that weight determination may be pre-calculated and implemented using a lookup table. The weights $w_{left}$, $W_{right}$, $W_{up}$, and $W_{down}$ may be calculated for filter 402b using:

$$w_{left,right} = \frac{1}{2 \cdot (|G_{left} - G_{right}| + \varepsilon)};$$

$$w_{up,down} = \frac{1}{2 \cdot (|G_{up} - G_{down}| + \varepsilon)}.$$

In various examples, filter 402b may be advantageous as it may be implemented as a 3×3 non-linear filter (e.g., filter 402b) rather than the 5×5 filter of filter 402a for improved computational efficiency. This may further limit power consumption which may be advantageous in resource constrained devices (such as battery-powered cameras). In various examples, the weights $w_{left}$, $W_{right}$, $W_{up}$, and $W_{down}$ may be normalized to sum to 1 so that gain is not added to the image. For example, each weight may be divided by the sum of the weights to normalize the weights. This division may be replaced by a lookup table to reduce the number of computations performed by the image signal processor.

Figure 4B:
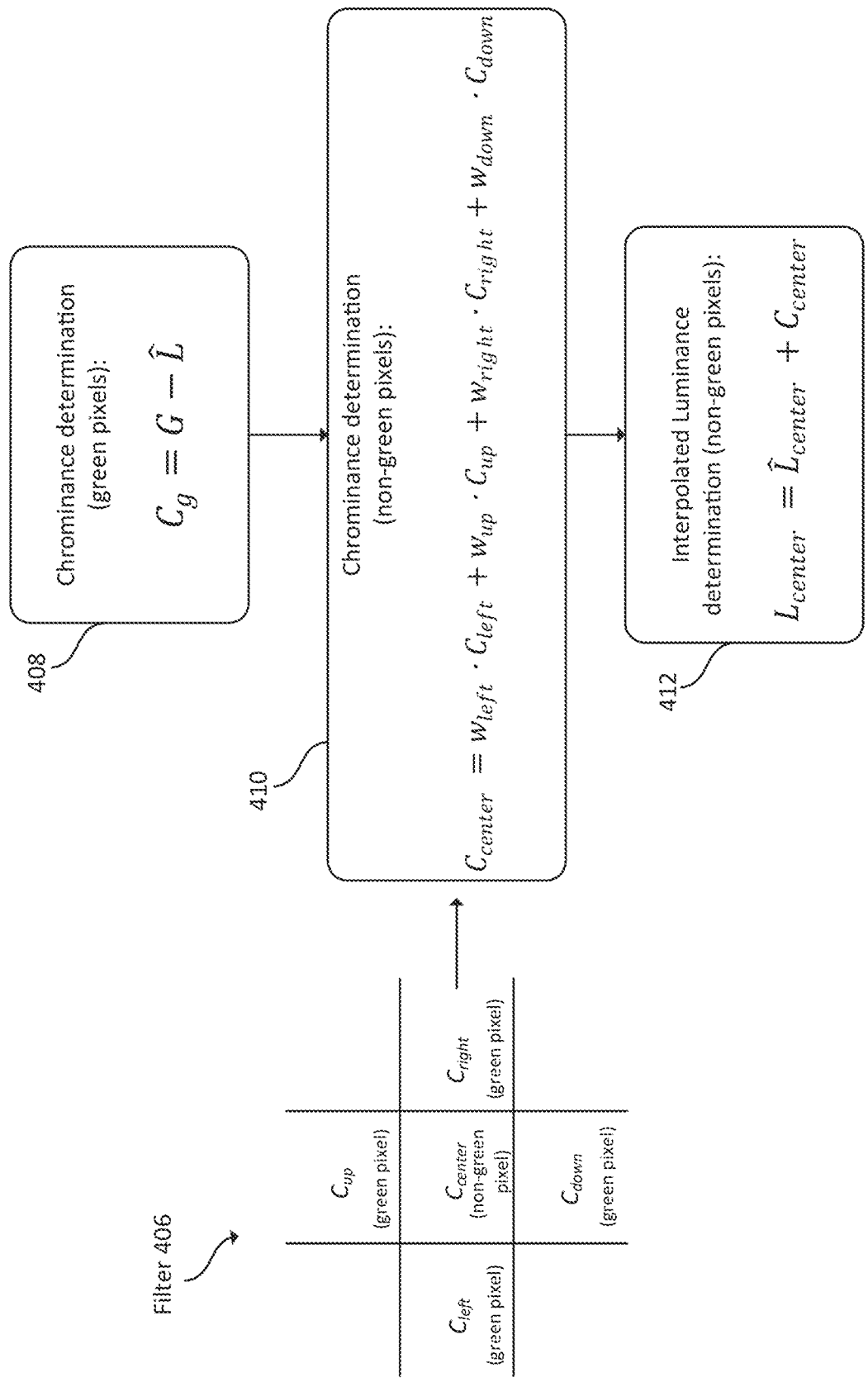
FIG. 4B is a diagram depicting chrominance determination for non-green pixels using the weight values determined in FIG. 4A, in accordance with various aspects of the present disclosure.

FIG. 4B is a diagram depicting chrominance determination for non-green pixels using the weight values determined in FIG. 4A, in accordance with various aspects of the present disclosure. As previously described, the estimated luminance value $\hat{L}$ may be acceptable for green pixels due to spectral intensity characteristics of green pixels. Accordingly, the chrominance for green pixels $C_g$ may be determined as $$C_g = G - \hat{L}$$

at block 408 where G is the raw pixel value for green pixels. The chrominance for non-green pixels may be determined at block 410 using a weighted combination of neighboring green pixels. For example, using the CFA pattern shown in FIG. 1 and FIG. 2, each non-green pixel is surrounded by four green pixels (e.g., $G_{left}$, $G_{right}$, $G_{up}$, and $G_{down}$). Accordingly, $C_{center}$ in FIG. 4B represents the subject pixel for which chrominance is being adaptively determined using the weighted combination of $C_g$ of surrounding pixels. Accordingly, in filter 406, $C_{left}$ represents the chrominance of the green pixel to the left of the subject pixel, $C_{right}$ represents the chrominance of the green pixel to the right of the subject pixel, $C_{up}$ represents the chrominance of the green pixel above the subject pixel, and $C_{down}$ represents the chrominance of the green pixel below the subject pixel. Accordingly, $w_{left} \cdot C_{left}$ represents the weight for the green pixel to the left of the subject pixel multiplied by the chrominance value of the green pixel to the left of the subject pixel, and so on. The chrominance of the subject pixel may be determined as:

$$C_{center} = W_{left} \cdot C_{left} + W_{up} \cdot C_{up} + W_{right} \cdot C_{right} + W_{down} \cdot C_{down}.$$

After determining the chrominance for all non-green pixels (block 410), the adaptively-interpolated luminance may be determined at block 412 for each non-green pixel by adding the chrominance value determined at block 410 (for the subject pixel ($C_{center}$)) to the estimated luminance for the subject pixel $\hat{L}_{center}$ (determined using a low pass filtering operation described in reference to FIG. 3). The actions described in FIG. 4B may be performed for each non-green pixel. As previously described the estimated luminance L may be acceptable for green pixels.

Figure 5:
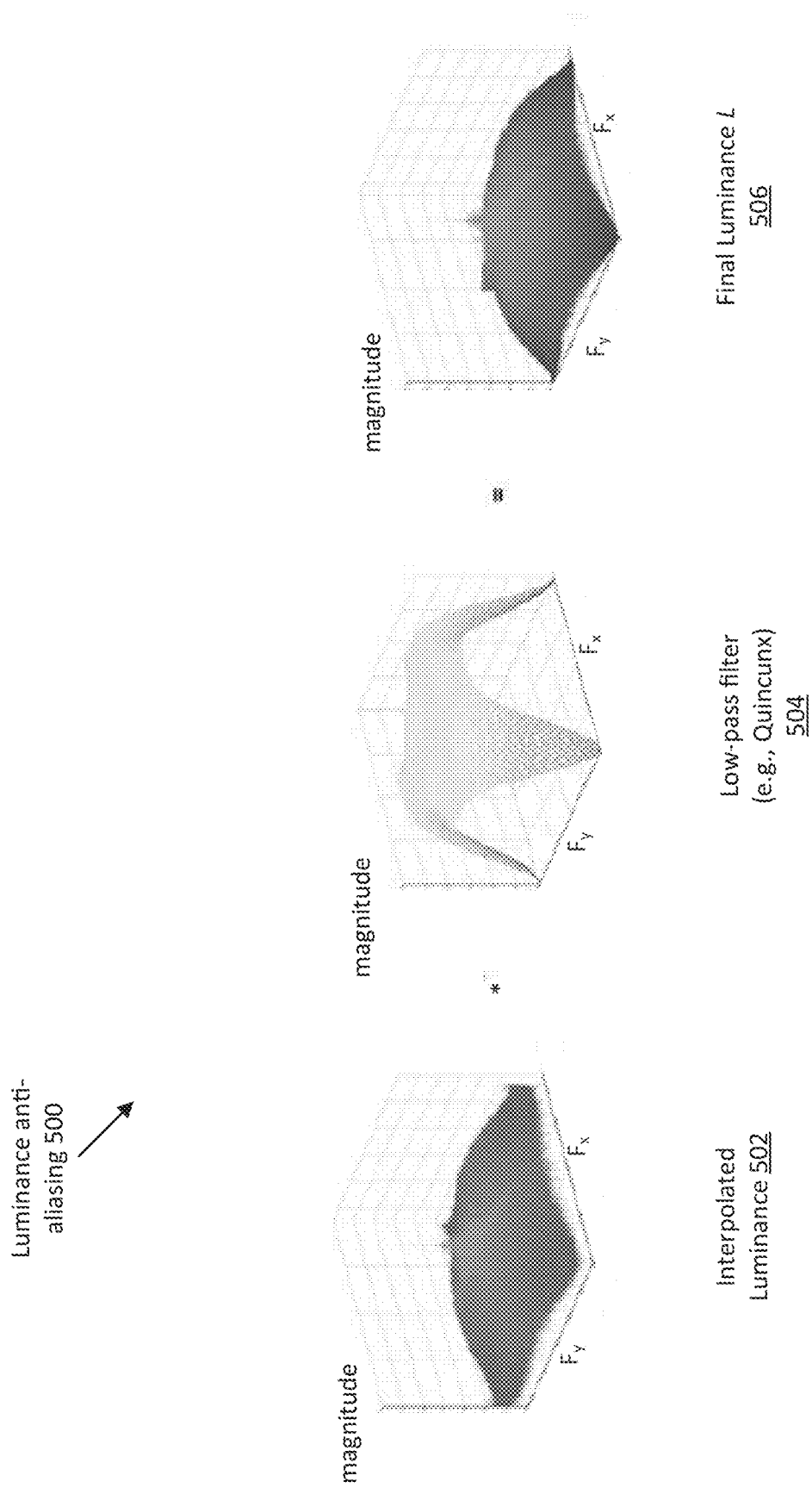
FIG. 5 depicts an example of an anti-aliasing filter used to filter luminance in the frequency domain, in accordance with various aspects of the present disclosure.

FIG. 5 depicts an example of an anti-aliasing filtering operation 500 used to filter luminance in the frequency domain, in accordance with various aspects of the present disclosure. FIG. 5 depicts an example of anti-aliasing using a low-pass filter in the frequency domain for ease of illustration. However, this filtering operation may instead be implemented in the spatial domain (e.g., the pixel domain) using a two dimensional convolution filter.

Interpolated luminance 502 may represent the luminance value determined for each pixel as described above in reference to FIG. 4B. A low-pass filter 504, such as the Quincunx filter, may be applied to the interpolated luminance 502 to determine the final luminance value L 506 for each pixel (e.g., an anti-aliased luminance value for each pixel). Note that the Quincunx filter would filter out the IR signal if applied prior to removal of IR using the low-pass filtering operation described above in reference to FIG. 2.

Accordingly, anti-aliasing after adaptively determining luminance may preserve IR information. Anti-aliasing filters such as the Quincunx filter remove high frequency artifacts (e.g., high frequency information below a threshold frequency value) and attempts to preserve the high frequency horizontal and vertical edges in the image while suppressing the high frequency diagonal signals. In some examples, the anti-aliasing operation described in reference to FIG. 5 may be omitted depending on the particular processing constraints and/or the desired image quality for a given implementation.

FIG. 6 depicts two example processes that may be used to determine per-pixel chrominance values for each channel, in accordance with various aspects of the present disclosure. After determining final luminance information for each pixel, chrominance interpolation and image formation 600 may be performed. The chrominance interpolation may be performed using a constant hue prior 602 or using color difference 604. The constant hue prior 602 uses a division operation which may be more computationally expensive when implemented in hardware relative to the subtraction used by color difference 604.

Using the constant hue prior 602 approach, it is assumed that the raw pixel value for a given pixel is the product of the luminance (L) and the chrominance (C) for the pixel. Accordingly, the chrominance (C) for the subject pixel may be determined using:

$$\text{chrominance}(C) = \frac{\text{raw}(R, G, B, IR)}{\text{luminance}(L)}.$$

However, this is single plane chrominance. For example, if a blue pixel (from the CFA pattern image, such as input image 110 of FIG. 1) is the subject pixel, the chrominance $C_b$ may be determined by dividing the raw blue pixel value by the adaptively determined luminance L (with L being determined as described above in reference to FIGS. 4B, 5). However, the chrominance values $C_{IR}$, $C_r$, and $C_g$ are missing for the subject blue pixel. The chrominance for these other channels (e.g., the missing channels) may be interpolated using bilinear interpolation and/or some other interpolation technique. For example, instead of bilinear interpolation, bicubic interpolation, spline interpolation, etc., may be used. However, bilinear interpolation may require fewer computations relative to the alternative approaches, yet may provide sufficient image quality for many applications. This is again due to the relative lack of sensitivity of the human eye to changes in chrominance. Accordingly, by subtracting (or, in the case of constant hue prior 602 dividing) out the luminance L, the bilinear or other interpolation may be performed on chrominance alone. Resulting errors caused by the interpolation of chrominance are minimal when viewed by the human eye.

After determining the chrominance for each channel, the R, G, B, and IR channel values may be determined as a product of chrominance and luminance for each channel. The resulting R, G, B, and IR values may be multiplexed and output as the output image $I_{R,G,B,IR}$. This is the output of the demosaicing algorithm. Further processing may be performed by other, downstream elements of the image signal processor (e.g., IR removal, color correction, white balance, etc.), as described in further detail below.

Using the color difference 604 approach, it is assumed that the raw pixel value for a given pixel is the sum of the luminance (L) and the chrominance (C) for the pixel. Accordingly, the chrominance (C) for the subject pixel may be determined using:

chrominance(C)=raw(R,G,B,IR)−luminance(L).

However, again, this is single plane chrominance. For example, if a red pixel (from the CFA pattern image, such as input image 110 of FIG. 1) is the subject pixel, the chrominance $C_r$ may be determined by dividing the raw red pixel value by the adaptively determined luminance L (with L being determined as described above in reference to FIGS. 4B, 5). However, the chrominance $C_{IR}$, $C_b$, and $C_g$ are missing for the subject red pixel. The chrominance for these other channels (e.g., the missing channels) may be interpolated using bilinear interpolation and/or some other interpolation technique. For example, instead of bilinear interpolation, bicubic interpolation, spline interpolation, etc., may be used. However, bilinear interpolation may require fewer computations relative to the alternative approaches, yet may provide sufficient image quality for many applications. This is again due to the relative lack of sensitivity of the human eye to changes in chrominance. Accordingly, by subtracting out the luminance L, the bilinear or other interpolation may be performed on chrominance alone. Resulting errors caused by the interpolation of chrominance are minimal when viewed by the human eye. Typical chrominance values obtained using the constant hue prior 602 technique are a result of division (as described above). Values for the chrominance channels may tend to oscillate around 1 and may be limited to a predefined range (e.g., [0, 2]). However, if color difference 604 is used (e.g., subtraction), the chrominance values may oscillate around 0 and may be limited to the [−1, 1] range. Example values are provided below (in an example 8×8 pixel block) for raw pixel values (displayed in 0-1 floating point), luminance values (0-1 floating point), and chrominance values for each channel.

Input raw (0-1 floating point):

| 0.1813 | 0.2232 | 0.1512 | 0.2198 | 0.1453 | 0.2297 | 0.1672 | 0.2390 |
| 0.2198 | 0.2056 | 0.2164 | 0.2093 | 0.2198 | 0.2019 | 0.2232 | 0.2056 |
| 0.1568 | 0.2297 | 0.1813 | 0.2232 | 0.1568 | 0.2164 | 0.1813 | 0.2265 |
| 0.2360 | 0.2056 | 0.2265 | 0.1980 | 0.2056 | 0.2019 | 0.2198 | 0.2129 |
| 0.1768 | 0.2329 | 0.1621 | 0.2164 | 0.1621 | 0.2232 | 0.1768 | 0.2297 |
| 0.2232 | 0.2129 | 0.2164 | 0.2129 | 0.2164 | 0.2198 | 0.2265 | 0.2019 |
| 0.1672 | 0.2360 | 0.1621 | 0.2297 | 0.1512 | 0.2297 | 0.1672 | 0.2232 |
| 0.2265 | 0.2093 | 0.2232 | 0.2129 | 0.2093 | 0.1940 | 0.2164 | 0.2056 |

Luminance (0-1 floating point):

| 0.2210 | 0.2218 | 0.2229 | 0.2194 | 0.2215 | 0.2265 | 0.2246 | 0.2236 |
| 0.2199 | 0.2202 | 0.2165 | 0.2199 | 0.2211 | 0.2183 | 0.2171 | 0.2150 |
| 0.2299 | 0.2293 | 0.2254 | 0.2218 | 0.2138 | 0.2143 | 0.2211 | 0.2245 |
| 0.2372 | 0.2355 | 0.2283 | 0.2158 | 0.2067 | 0.2164 | 0.2232 | 0.2355 |
| 0.2313 | 0.2333 | 0.2203 | 0.2116 | 0.2128 | 0.2233 | 0.2302 | 0.2292 |
| 0.2247 | 0.2313 | 0.2184 | 0.2138 | 0.2213 | 0.2293 | 0.2302 | 0.2204 |
| 0.2246 | 0.2366 | 0.2299 | 0.2273 | 0.2286 | 0.2266 | 0.2176 | 0.2151 |
| 0.2253 | 0.2278 | 0.2296 | 0.2324 | 0.2130 | 0.2040 | 0.2058 | 0.2088 |

Chrominance (interpolated: $C_R$):

| 0.9032 | 0.9073 | 0.9113 | 0.9199 | 0.9285 | 0.9320 | 0.9354 | 0.9413 |
| 0.9072 | 0.9093 | 0.9115 | 0.9200 | 0.9286 | 0.9307 | 0.9327 | 0.9386 |
| 0.9111 | 0.9114 | 0.9116 | 0.9202 | 0.9288 | 0.9294 | 0.9301 | 0.9359 |
| 0.9181 | 0.9183 | 0.9185 | 0.9255 | 0.9325 | 0.9331 | 0.9338 | 0.9362 |
| 0.9250 | 0.9253 | 0.9255 | 0.9308 | 0.9362 | 0.9368 | 0.9374 | 0.9365 |
| 0.9279 | 0.9264 | 0.9250 | 0.9303 | 0.9357 | 0.9385 | 0.9413 | 0.9404 |
| 0.9307 | 0.9276 | 0.9244 | 0.9298 | 0.9351 | 0.9401 | 0.9451 | 0.9442 |
| 0.9260 | 0.9229 | 0.9198 | 0.9269 | 0.9340 | 0.9389 | 0.9439 | 0.9471 |

Chrominance (interpolated: $C_G$):

| 1.0041 | 1.0060 | 1.0064 | 1.0052 | 1.0039 | 1.0042 | 1.0073 | 1.0094 |
| 1.0022 | 1.0038 | 1.0034 | 1.0037 | 1.0059 | 1.0089 | 1.0106 | 1.0130 |
| 0.9995 | 1.0014 | 1.0005 | 1.0017 | 1.0070 | 1.0114 | 1.0107 | 1.0110 |
| 0.9983 | 0.9987 | 0.9980 | 1.0011 | 1.0055 | 1.0076 | 1.0068 | 1.0076 |
| 0.9971 | 0.9975 | 0.9986 | 1.0018 | 1.0038 | 1.0046 | 1.0049 | 1.0083 |
| 0.9972 | 0.9988 | 1.0001 | 1.0021 | 1.0043 | 1.0066 | 1.0078 | 1.0135 |
| 1.0005 | 1.0007 | 1.0000 | 1.0021 | 1.0060 | 1.0104 | 1.0132 | 1.0180 |
| 1.0046 | 1.0034 | 0.9992 | 1.0003 | 1.0040 | 1.0085 | 1.0115 | 1.0138 |

Chrominance (interpolated: CB):

| 0.9037 | 0.9112 | 0.9187 | 0.9368 | 0.9549 | 0.9672 | 0.9795 | 0.9952 |
| 0.9067 | 0.9142 | 0.9217 | 0.9336 | 0.9455 | 0.9578 | 0.9701 | 0.9752 |
| 0.9097 | 0.9172 | 0.9247 | 0.9304 | 0.9362 | 0.9485 | 0.9608 | 0.9552 |
| 0.9137 | 0.9205 | 0.9274 | 0.9331 | 0.9389 | 0.9433 | 0.9477 | 0.9421 |
| 0.9176 | 0.9239 | 0.9301 | 0.9358 | 0.9416 | 0.9381 | 0.9347 | 0.9291 |
| 0.9225 | 0.9288 | 0.9350 | 0.9421 | 0.9491 | 0.9457 | 0.9422 | 0.9408 |
| 0.9274 | 0.9337 | 0.9399 | 0.9483 | 0.9567 | 0.9533 | 0.9498 | 0.9525 |
| 0.9319 | 0.9399 | 0.9479 | 0.9564 | 0.9648 | 0.9692 | 0.9737 | 0.9764 |

Chrominance (interpolated: $C_{IR}$):

| 0.7532 | 0.7484 | 0.7584 | 0.7680 | 0.7909 | 0.7961 | 0.8164 | 0.8281 |
| 0.7427 | 0.7476 | 0.7552 | 0.7627 | 0.7695 | 0.7764 | 0.7904 | 0.8045 |
| 0.7299 | 0.7393 | 0.7440 | 0.7534 | 0.7528 | 0.7617 | 0.7577 | 0.7797 |
| 0.7271 | 0.7311 | 0.7376 | 0.7441 | 0.7455 | 0.7470 | 0.7510 | 0.7549 |
| 0.7300 | 0.7283 | 0.7284 | 0.7407 | 0.7520 | 0.7467 | 0.7425 | 0.7556 |
| 0.7301 | 0.7256 | 0.7314 | 0.7373 | 0.7418 | 0.7464 | 0.7513 | 0.7563 |
| 0.7313 | 0.7262 | 0.7263 | 0.7449 | 0.7522 | 0.7633 | 0.7565 | 0.7867 |
| 0.7248 | 0.7268 | 0.7397 | 0.7526 | 0.7664 | 0.7801 | 0.7986 | 0.8171 |

In the example values above, the chrominance values CR, G, B, IR have been obtained using the constant hue prior 602 technique.

After determining the chrominance for each channel, the R, G, B, and IR channel values may be determined as a sum of chrominance and luminance for each channel. The resulting R, G, B, and IR values may be multiplexed and output as the output image $I_{R,G,B,IR}$. This is the output of the demosaicing algorithm. Further processing may be performed by other, downstream elements of the image signal processor (e.g., IR removal, color correction, white balance, etc.), as described in further detail below.

Figure 7:
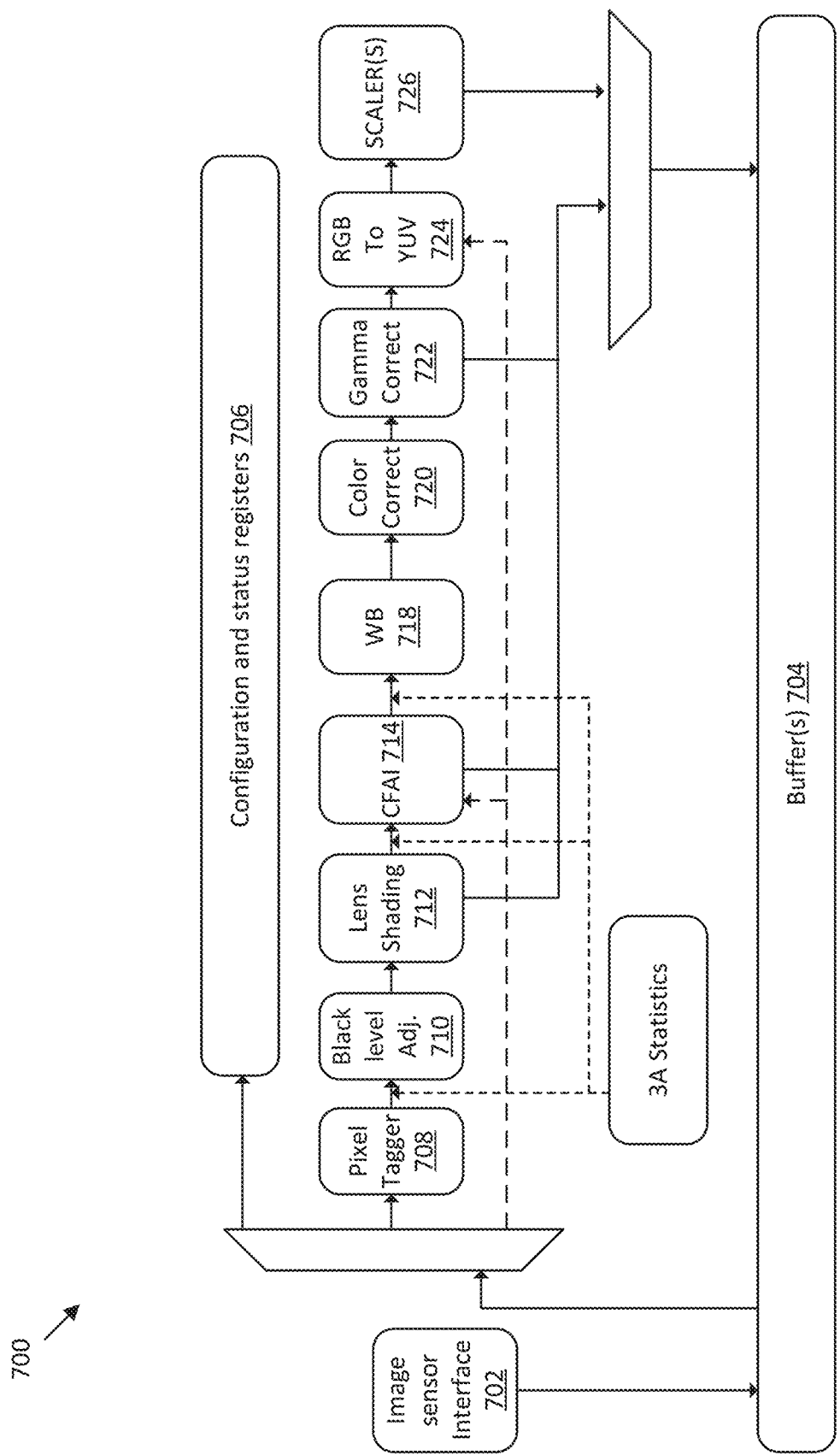
FIG. 7 is a block diagram of an example image signal processor architecture that may be used in accordance with various aspects of the present disclosure.

FIG. 7 is a block diagram of an example image signal processor architecture 700 that may be used in accordance with various aspects of the present disclosure. In some examples, an image signal processor may be implemented with a different architecture relative to the example image signal processor architecture 700 displayed in FIG. 7. For example, certain components may be omitted, additional components may be added, and/or some components may be substituted for other, different components, depending on the desired implementation.

The image signal processor architecture 700 (e.g., an image signal processor (ISP)) may include an image sensor interface 702 that receives image data from the image sensor (e.g., as filtered using the CFA). For example, the image sensor interface 702 may be a mobile industry processor interface ("MIPI") such as MIPI D-PHY or MIPI C-PHY. MIPI D-PHY is a physical layer that includes a clock-forwarded synchronous link providing low noise and high jitter tolerance. MIPI D-PHY uses one clock lane and a variable number of data lanes to receive the image data from the image sensor. MIPI C-PHY, by contrast, uses an embedded clock that is embedded into the data lane. In various examples, the image sensor interface 702 may bridge a MIPI controller interface data to a streaming interface (e.g., an AXI streamlining interface) that writes data to AXI memory.

Buffer(s) 704 may comprise one or more circular buffers that may be used for streamlining to/from AXI (or other streaming protocols). In various examples, inbound data streams may be managed by circular buffer readers and outbound data streams may be managed by circular buffer writers. The buffer(s) 704 may use circular buffer management addresses/pointers to map an AXI stream either to or from linear AXI memory. This streamlining to/from circular buffers provides data storage/capture/replay capability in static random access memory (SRAM).

Configuration and status registers 706 may store various configuration data such as, for example, CFA index values, pixel color values associated with different CFA index values (e.g., in a table), per-CFA index offset values, gain values, etc. As described below, various components of the image signal processor architecture 700 may reference configuration and/or status data stored by configuration and status registers 706 during operation.

Image data may be received via image sensor interface 702 as an inbound pixel stream (IPS) comprising raw pixel values generated by the image sensor. Pixel tagger 708 may include circuitry (e.g., an ASIC) that tags the IPS data with metadata representing a coordinate (e.g., an X, Y coordinate) corresponding to the location of the pixel on the image sensor and/or the corresponding frame of image data. In addition, the pixel tagger 708 may tag the pixel with metadata representing an index position of the CFA. The X, Y coordinates may be used to lookup the pixel color (e.g., to represent the pixel as a red, green, blue, or infrared pixel based on the type of filter found at the index of the CFA). In some cases, metadata representing the pixel color (red, green, blue, or IR) may also be used by pixel tagger 708 to tag the inbound IPS data.

For example, pixel tagger 708 may use the frame width (in terms of a number of pixels) and height (in terms of a number of pixels) to tag the incoming raw pixel value (IPS data) with an X-Y position within the frame. The X, Y coordinates may be used to lookup a pixel color in a 16 entry table (e.g., corresponding to the color filters of the CFA) to label each pixel value with pixel color metadata. Similarly, each pixel value may be labeled with a CFA index (e.g., 0-15) that corresponds to the pixel value.

After tagging the pixel values using the pixel tagger 708 (as described above), the pixel values may be provided to black level adjustment component 710. black level adjustment component 710 may include circuitry (e.g., an ASIC) effective to subtract a fixed direct current (DC) offset value from the input pixel values to adjust the black level of the image data. The particular DC offset value may be specific to each CFA index. Accordingly, the CFA index value metadata generated by pixel tagger 708 may be used by black level adjustment component 710 to determine the appropriate DC offset value to subtract for each pixel.

In various examples, the image signal processor architecture 700 may include a lens compensation component (not shown). A lens compensation component may be used to add a signed per-CFA index offset to compensate for veiling glare resulting from a lens of the camera generating the image data. Further, in some examples, a lens compensation component may apply a common multiplier (uniform gain) to all pixels to boost the signal. Further, in some examples, the lens compensation component (and/or a separate component) may perform defective pixel correction (DPC). DPC may evaluate each pixel's raw pixel value against an expected range of pixel values that is estimated using nearby pixels (e.g., adjacent pixels and/or pixels within a predefined distance from the subject pixel). If the pixel's raw pixel value is out of range the pixel may be deemed "defective" and the raw pixel value may be replaced by a pixel value that is estimated using nearby pixels of the same pixel color.

The pixel data may be sent to the lens shading component 712. In some examples, the lens shading component 712 may be combined with the lens compensation component 710. However, in other implementations, these components may be implemented using separate circuits and/or modules. Lens shading component 712 may compensate for lens and camera defects and/or tolerances, as well as lens edge transmission characteristics by applying a per-pixel color gain based on the X, Y position of the pixel in the frame. In various examples, the lens shading component 712 may lookup the per-pixel color gain using the X, Y position metadata of the pixel (added by pixel tagger 708) in a table stored in configuration and status registers 706. In various examples, the per-pixel color gain may also be determined using the metadata indicating the pixel's color. The gain may be multiplicatively applied to the pixel using a multiplier circuit of the lens shading component 712 in order to account for lens properties and manufacturing tolerances. In various implementations, the per-pixel color gain may be determined using the pixel's X, Y position metadata to identify a lens-shading cell of a grid. The corners of the cell may define the four corner grid points. Each corner grid point may be associated with a respective lens shading gain for the pixel's pixel color. The four lens shading gains may be interpolated to determine the gain to be applied to the pixel.

After lens shading component 712, the modified pixel data (e.g., the modified raw pixel values and the various metadata tagging each pixel described above) may be sent to CFA interpolation (CFAI) component 714. CFAI component 714 may perform CFA interpolation (demosaicing) as described above in reference to FIGS. 1-6 to generate $I_{R,G,B,IR}$ image data for the current frame of image data. The various techniques used to generate $I_{R,G,B,IR}$ image data for the current frame of image data will not be repeated in reference to FIG. 7 for brevity.

White balance component 718 may apply a per-CFA index multiplier (e.g., determined using a lookup table for each CFA index) as a gain to each pixel value. In various examples, white balancing and/or gamma correction (e.g., performed by gamma correction component 722) may be implemented by the same component (e.g., ASIC) as the color correction component 720.

In some example implementations, the fully de-mosaiced image output by CFAI component 714 may have IR removed by an IR removal component (not shown in FIG. 7). Red, Green, Blue, and IR pixels have similar infrared responses in terms of spectral sensitivity. Accordingly, it is possible to use IR pixels as a reference to subtract off IR from the R, G, B pixels to remove IR information. Accordingly, an optional IR removal component may subtract the IR pixel values as a reference to remove infrared values from the image data.

In some cases, visible light pixels (R, G, B pixels) may be saturated when IR pixels are not saturated. In such a case, subtraction of an unsaturated IR value from a saturated R, G, B pixel may result in overcompensation which produces some unnatural results (e.g., dark skies and/or black suns in outdoor images). Accordingly, in various examples, the optional IR removal component may perform a 3×3 matrix multiplication on R, G, B color pixels if such pixels are unsaturated. If pixels (and particularly green pixels which have higher and broader spectral response) are saturated, the IR component may be corrected using a secondary clip operation. Optimal clip values may be determined using statistics gathered from prior frames by analyzing regions of green pixels that are saturated.

Color correction component 720 may be a circuit (e.g., a color correction circuit) effective to apply a color correction matrix (CCM) to the color planes to correct the color space. For example, if IR is first removed the CCM may be:

$$\text{Pixel}[R\ B\ G] = \begin{bmatrix} KR_R & KB_B & KG_G \\ KB_R & KB_B & KB_G \\ KG_R & KG_B & KG_G \end{bmatrix} \cdot \begin{bmatrix} R \\ B \\ G \end{bmatrix}$$

However, in other examples, IR information may be treated as another dimension of the image and not as a contaminant to the image. Such examples may not use an IR removal component, but may instead use a 4×3 matrix operation that takes 4 channels at input (R, G, B, and IR) and outputs 3 channels (R, G, B) eliminating the IR removal component. In such examples, the CCM may be a 4×3 matrix with rows that sum to 1, thereby avoiding overcompensation. Color correction component 720 may be implemented as a matrix multiplication circuit.

The CCM and white balance gains may be determined using statistics related to calibration of the image sensor. Such calibration statistics may include Auto-white balance statistics, auto-exposure statistics, and auto-focus statistics. Collectively, these statistics are often referred to as "3A statistics." The 3A statistics may be stored in memory (e.g., in configuration and status registers 706) and may be used to determine the white balance gains and/or the CCM as described below in reference to FIG. 13. Accordingly, the 3A statistics may be provided at various points in the image signal processing pipeline prior to WB component 718 and color correction component 720, as shown in FIG. 7.

Gamma correction component 722 is used to correct for the differences between the way the image sensor captures information and the way that the human visual system processes light. In the image signal processor architecture 700 gamma correction may be performed using a lookup for each channel (e.g., R, G, and B) of each pixel to adjust the contrast of the image. Each color (R, G, B) may be associated with an independent gamma table that is used to lookup a gamma corrected value. In various examples, the lookup tables may be indexed by the pixel color value. The lookup tables may store the gamma corrected pixel values.

RGB to YUV component 724 may transform the RGB format data to the YUV format. In various examples, RGB to YUV component 724 may employ a 3×3 matrix multiplication followed by addition of an offset. For example:

$$Y = [R\ G\ B]\begin{bmatrix} Y_R \\ Y_G \\ Y_B \end{bmatrix} + Y_{offset};$$

$$U = [R\ G\ B]\begin{bmatrix} U_R \\ U_G \\ U_B \end{bmatrix} + U_{offset};$$

-continued $$V = [R\ G\ B]\begin{bmatrix} V_R \\ V_G \\ V_B \end{bmatrix} + V_{offset}.$$

In various examples, the YUV format may require less bandwidth for transmission and/or storage.

Scaler 726 may be used to upscale or downscale the YUV (or RGB) data prior to converting the image data into a bit stream for writing to buffer(s) 704 (e.g., a circular buffer). In various examples, each of the luma (Y) and chroma (UV) channels may have separate configurations, to allow them to each be scaled independently. This may be important when converting from YUV444 to YUV420, as chroma is scaled to be 14 the resolution (½ in each of the X,Y directions) of luma. Scaler 726 also provides cropping functionality such that the field of the output frame is a subset of the field of the input frame.

The scaler 726 first comprises a decimator followed by a filter. The decimator can be used to reduce the image size by 4:1, 3:1, 2:1, leave the image size unchanged, and/or change the image size by some other ratio, depending on the implementation. The image size may be changed independently in each of the horizontal (H) and vertical (V) directions.

In some examples, the decimator can be programmed to drop input pixels at the left, right, top, and bottom edges of the input image, providing for some cropping capability. Further cropping capability may be provided by the scaling function, with the added benefit of possibly more desirable edge interpolation, as the post-decimation image would not need to be edge extrapolated.

After the decimator stage, the input pixels define an annotated grid of locations, with columns (COLS) and rows (ROWS) (where COLS and ROWS is the post-decimator frame size). The scaler 726 uses the calibrated input grid and a set of configuration registers that are used to determine from where in the calibrated input grid each output pixel should be interpolated/extrapolated. The input pixels are defined to exist in the middle of each cell in the grid, thus the first input pixel is at 0.5, 0.5 in the defined grid.

Figure 9:
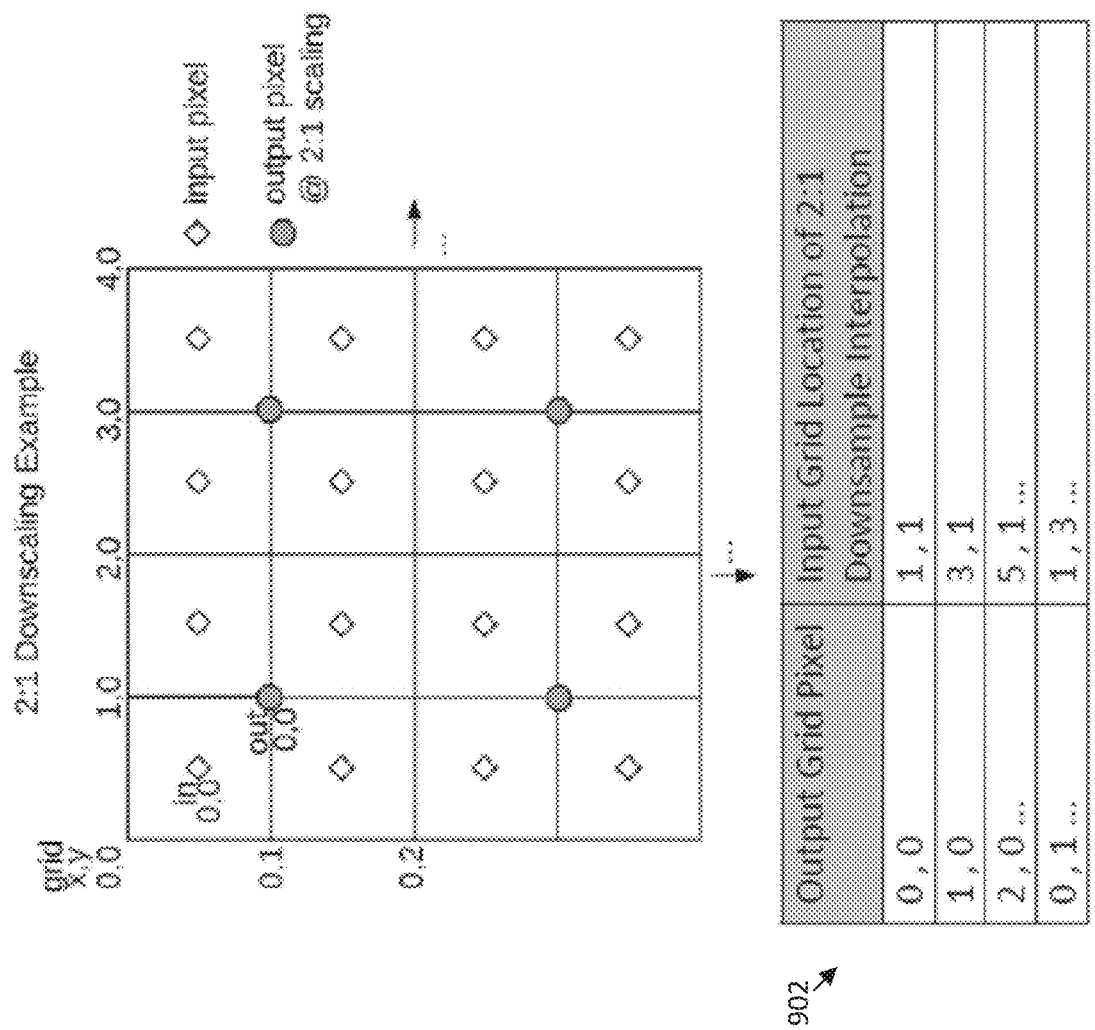
FIG. 9 is an example of image downscaling that may be performed in accordance with various aspects of the present disclosure.

FIG. 9 is a 2:1 example of image downscaling that may be performed in accordance with various aspects of the present disclosure. For example, to downscale from 640× 480 to 320×240 is a 2:1 downscale, and the input grid is 640 COLS and 480 ROWS of grid cells, but the grid points are 0,0 to 641,481. The output pixel at 0,0 of the output grid is interpolated from location 0.5,0.5 in the input grid. Other output pixels are interpolated as shown in table 902 of FIG. 9.

To accomplish this, the scaler 726 uses, for each direction, a configured "initial" position value (Init) and position "increment" value (Incr) in order to specify where the output pixels are interpolated from within the input pixel frame grid. In the current example, Init=1 and Incr=2, so that the output pixels will have 2× the spacing of the input pixels, effectively a 2:1 downscale.

In each direction, the scaler 726 maintains a position register to indicate the position on the input grid from which to interpolate the output pixel. This position starts with the Init value, and is advanced by the amount of the Incr value after each output pixel is generated in that direction.

Thus, for the horizontal direction, output_pixel[0] is generated at grid position Init, output_pixel[1] is generated at grid position Init+Incr, . . . and output_pixel[N] is generated at grid position Init+N*Incr.

It should be noted that the RGB to YUV conversion by RGB to YUV component 724 and/or the up-scaling or down-scaling by scaler 726 may be optional operations that may not be performed in all cases. Output streams (e.g., frames of image data processing using the various components described above in reference to FIG. 7) may be sent to one or more buffers of the AXI (or other streaming protocol) memory.

Figure 8:
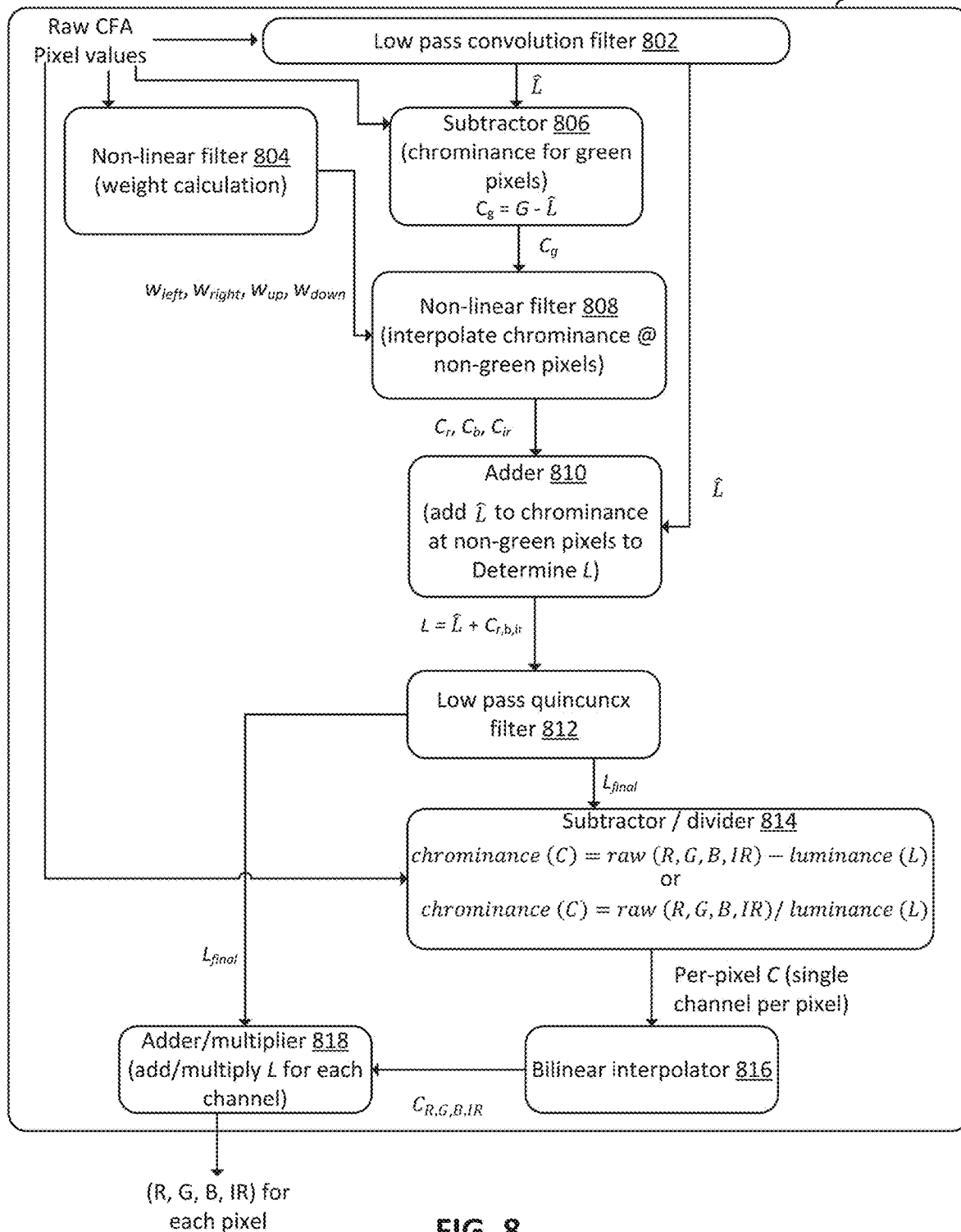
FIG. 8 is an example block diagram depicting various hardware and operations that may be used to perform one or more of the color filter array interpolation techniques described herein, in accordance with various aspects of the present disclosure.

FIG. 8 is an example block diagram depicting various hardware and operations that may be used to perform one or more of the color filter array interpolation techniques described herein, in accordance with various aspects of the present disclosure. In various examples, the various components displayed in FIG. 8 may be components of CFAI component 714 that may be used to perform the CFA interpolation.

Raw CFA pixel values may be received from the image sensor overlaid with the CFA. As described above in reference to FIG. 7, the pixel tagger 708 may first assign CFA index values, X, Y pixel coordinates, and pixel colors to the raw CFA pixel values. Low pass convolution filter 802 may be a two-dimensional convolution filter effective to perform a two-dimensional convolution for each pixel (e.g., after mirroring columns and rows of pixels at the edge of the frame, as described above). In a higher performance implementation example (e.g., one pixel computation per clock cycle), a buffer may store a kernel (e.g., a 5×5 filter kernel) and a table may store coefficients for the convolution. In this example implementation there are 25 multipliers followed by an addition operation for each pixel. In a lower performance implementation example, a single multiplier may be used and the pixel/coefficients may be multiplexed to share the multiplier/accumulator stage. Low pass convolution filter 802 may be configured to filter out higher frequency information from the raw pixel values. Accordingly, the output of low pass convolution filter 802 in FIG. 8 is depicted as the estimated luminance $\hat{L}$.

Similarly, the raw CFA pixel values may be filtered using a non-linear filter 804 that may be effective to perform weight calculation, as described above in reference to FIG. 4A. Depending on the desired weight calculation implementation, the filter size may vary (e.g., a 5×5 kernel as in filter 402a or a 3×3 kernel filter as in filter 402b). It should be noted that the demosaicing techniques described herein are not limited to these two kernel sizes or to these two examples of weight calculation. Other weight calculation techniques may be used in accordance with the demosaicing systems and algorithms described herein. Similarly to the low pass convolution filter 802, the non-linear filter 804 may be a non-linear filter circuit implemented using multipliers, adders, accumulators, and/or multiplexers (depending on the desired level of performance). The non-linear filter 804 may be used to calculate the weights for each non-green pixel (as labeled by pixel tagger 708).

The estimated luminance L for green pixels may be used by a subtractor 806 (e.g., an adder integrated circuit that is effective to perform subtraction) to determine the chrominance $C_g$ for green pixels. Green pixel chrominance $C_g$ and the set of weights output by non-linear filter 804, $w_{left}$, $W_{right}$, $w_{up}$, and $W_{down}$, may be input into non-linear filter 808 to interpolate chrominance for each non-green pixel. This operation may be performed as described above in reference to FIG. 4B for each non-green pixel. As shown, a 3×3 kernel may be used to perform the operation. The two-dimensional convolution may be implemented using one or more multipliers, a table for storing pixel values/filter coefficients, and an adder circuit. Depending on the desired level of performance a multiplexer and/or an accumulator may also be used, as described above.

The chrominance for non-green pixels $C_{ir}$, $C_b$, and $C_r$ and the estimated luminance L output by low pass convolution filter 802 may be sent to adder 810. For each non-green color channel (e.g., R, B, and IR), adder 810 may add the estimated luminance L to the chrominance to determine luminance L. For green pixels, the estimated luminance L may be accepted as the luminance L due to spectral characteristics of green light.

The luminance L may be low-pass filtered using, for example, a Quincuncx filter 812 as described above in reference to FIG. 5. The Quincuncx filter 812 (or other desired low pass filter implementation) may be implemented in the spatial/pixel domain using a two-dimensional convolution operation by convolving a two-dimensional convolution filter kernel (e.g., the Quincuncx filter) with the interpolated luminance value (e.g., interpolated luminance 502) for each pixel. Acccordingly, one or more multipliers, adders, and/or tables may be used to perform the two-dimensional convolution and store the result for each pixel. Anti-aliasing filters such as the Quincunx filter remove high frequency artifacts and attempts to preserve the high frequency horizontal and vertical edges in the image while suppressing the high frequency diagonal signals.

The low pass Quincuncx filter 812 may output the final luminance value Lfnal for each pixel which may be passed to a subtractor/divider 814. The choice of component here may depend on whether the constant hue prior 602 technique is used or the color difference 604 technique is used to determine chrominance for each pixel. A subtractor may be an adder circuit that is also effective to perform subtraction. Similarly, a divider may be a multiplier circuit that is also effective to perform division. Raw CFA pixel values may also be sent to subtractor/divider 814.

If the color difference 604 technique is used, chrominance for one color channel (e.g., the blue channel for a blue pixel, etc.) may be determined using:

chrominance($C$)=raw($R,G,B,IR$)−luminance($L$).

Similarly, if constant hue prior 602 technique is used, chrominance for one color channel (e.g., the red channel for a red pixel, etc.) may be determined using:

$$\text{chrominance}(C) = \frac{\text{raw}(R, G, B, IR)}{\text{luminance}(L)}.$$

Accordingly, one chrominance value (for the color channel corresponding to the pixel color) and the luminance value may be known for each pixel after subtractor/divider 814. The chrominance values (e.g., per-pixel C) may be sent to a bilinear interpolator 816 which may perform bilinear interpolation to determine the missing chrominance values for each pixel. As is known, bilinear interpolation may be implemented using a set of additions and subtractions (or as two-dimensional convolutions, depending on the desired implementation).

The final luminance for each pixel ($L_{final}$) and the chrominance value for all four color channels (e.g., R, G, B, and IR) may be sent to an adder/multiplier 818 (depending on whether constant hue prior 602 technique or color difference 604 technique is used) which may add/multiply the final luminance $L_{final}$ and the chrominance value for each color channel to obtain the output pixel value for each color channel (R, G, B, and IR). In some examples, further image processing may be performed (e.g., as described above in reference to FIG. 7) after demosaicing/CFA interpolation.

Figure 10:
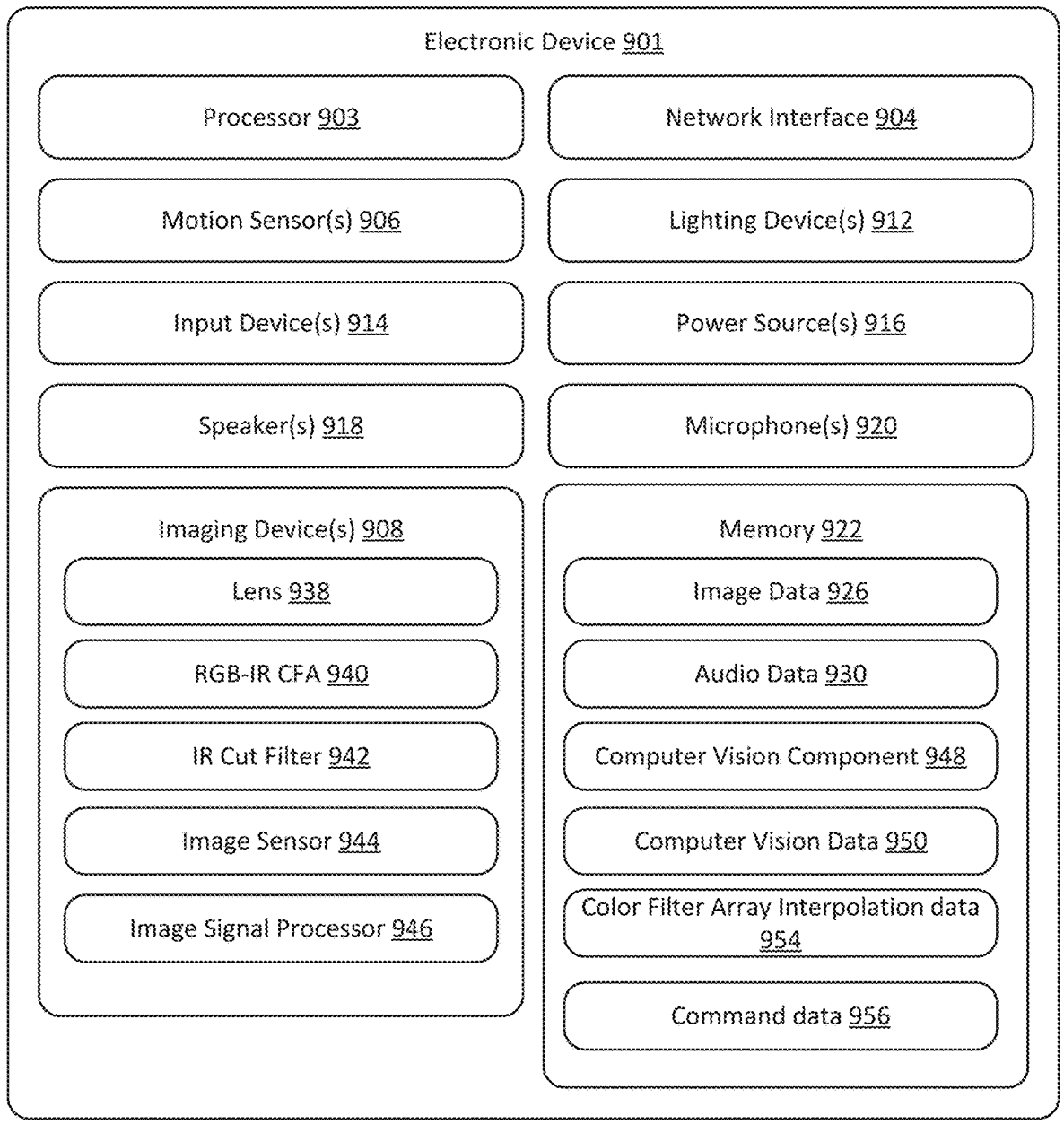
FIG. 10 is a block diagram showing an example architecture of a computing device that may be used in accordance with various aspects of the present disclosure.

FIG. 10 illustrates an example architecture of the electronic device 901. As shown, the electronic device 901 may include one or more processors 903, one or more network interfaces 904, one or more motion sensors 906, one or more imaging devices 908, one or more lighting devices 912, one or more input devices 914, one or more power sources 916, one or more speakers 918, one or more microphones 920, and memory 922.

The motion sensor(s) 906 may be any type of sensor capable of detecting and communicating the presence of an object within their field of view. As such, the motion sensor(s) 906 may include one or more (alone or in combination) different types of motion sensors. For example, in some embodiments, the motion sensor(s) 906 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 903, for example, to one or more threshold voltage values to determine if the amount of voltage in the output signal is indicative of motion, and/or if the amount of voltage in the output signal is indicative of motion of an object that is to be captured by the imaging device(s) 908. In some examples, the processor(s) 903 may determine the distance based on the amount of voltage in the output signal. Additionally, or alternatively, in some examples, the processor(s) 903 may determine the distance based on which motion sensor 906 detected the object.

Although the above discussion of the motion sensor(s) 906 primarily relates to PTR sensors, depending on the example, the motion sensor(s) 906 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 906.

An imaging device 908 may include any device that includes an image sensor 944, such as a charge-coupled device (CCD) and/or an active-pixel sensor (CMOS sensor), that is capable of generating image data 926 (which may represent, and/or include, the frames of image data described herein), representing one or more images (e.g., a video). The imaging device 908 may include a lens 938 that is effective to focus light on the image sensor 944. As previously described, the light may be filtered by an RGB-IR CFA 940. In various examples, the color light filters of the RGB-IR CFA 940 may follow the pattern exhibited by input image 202 and/or input image 110 (although more or fewer colored light filters may be included depending on the particular image sensor 944 used. In one aspect of the present disclosure, the image sensor 944 may comprise a complementary metal-oxide semiconductor (CMOS) array and may be capable of recording high definition (e.g., 722p, 1800p, 4K, 8K, etc.) image and/or video files. The image sensor 944 may comprise a plurality of photosensors that may transform light into electrical signals. Such electrical signals may be represented by numerical values (e.g., floating point numbers) that may be processed using the image signal processor 946. Each photosensor of the image sensor 944 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

Additionally, in some examples, the imaging device(s) 908 may include a mechanically-actuated IR cut filter 942 that may be interposed between the lens 938 and the image sensor 944 (or between the lens 938 and the RGB-IR CFA 940) in order to filter out infrared light. Note that the IR cut filter 942 is optional and may be omitted in some implementations (along with one or more other elements shown in FIG. 10). In some other examples, the image sensor may be coated with a dual band-pass filter that has a passband at about 900 nm to allow IR color reproduction during the day and also to allow IR light detection when the imaging device(s) 908 are in night mode. The imaging device 908 may include a separate image signal process 946 (e.g., including image signal processor architecture 700 or some other desired architecture), or the processor(s) 903 may perform the camera processing functionality. The processor(s) 903 (and/or camera processor) may include an encoding and compression chip. In some embodiments, the processor(s) 903 (and/or the camera processor) may comprise a bridge processor. The processor(s) 903 (and/or the camera processor) may process video recorded by the image sensor and may transform this data into a form suitable for transfer by the network interface(s) 904. In various examples, the imaging device 908 also includes memory, such as volatile memory that may be used when data is being buffered or encoded by the processor(s) 903 (and/or the camera processor). For example, in certain embodiments the camera memory may comprise synchronous dynamic random-access memory (SD RAM).

The lighting device(s) 912 may be one or more light-emitting diodes capable of producing visible light and/or infrared light when supplied with power (e.g., to enable night vision). In some embodiments, when activated, the lighting device(s) 912 illuminates a light pipe. In some examples, the electronic device 901 uses the lighting device(s) 914 to illuminate specific components of the electronic device 901, such as the input device(s) 914. This way, users are able to easily see the components when proximate to the electronic device 901.

An input device 914 may include, but is not limited to, a button, a touch-sensitive surface, a switch, a slider, and/or any other type of device that allows a user to provide input to the electronic device 901. For example, if the electronic device 901 includes a doorbell, then the input device 914 may include a doorbell button. In some examples, based on receiving an input, the processor(s) 903 may receive a signal from the input device 914 and use the signal to determine that the input device 914 received the input. Additionally, the processor(s) 903 may generate input data 928 representing the input received by the input device(s) 914. For example, the input data 928 may represent the type of input (e.g., a push to a button), a time that the input occurred, and/or the like.

The power source(s) 916 may include one or more batteries that provide power to the electronic device 901. However, in other examples, the electronic device 901 may not include the power source(s) 916. In such examples, the electronic device 901 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 918 may be any electromechanical device capable of producing sound in response to an electrical signal input. The microphone(s) 920 may be an acoustic-to-electric transducer or sensor capable of converting sound waves into audio data 930 representing the sound. The speaker(s) 918 and/or microphone(s) 920 may be coupled to an audio CODEC to enable digital audio received by user devices to be decompressed and output by the speaker(s) 918 and/or to enable audio data captured by the microphone(s) 920 to be compressed into digital audio data 930. In some examples, the electronic device 901 includes the speaker(s) 918 and/or the microphone(s) 920 so that the user associated with the electronic device 901 can communicate with one or more other users located proximate to the electronic device 901. For example, the microphone(s) 920 may be used to generate audio data representing the speech of the one or more other users, which is then sent to the user device 108. Additionally, the speaker(s) 918 may be configured to output user speech of the user, where the user's user speech may also be represented by audio data 930.

In some examples, the electronic device 901 determines that the start of the video is the first frame of the video. In some examples, such as when the electronic device 901 continuously generates the image data 926 (e.g., the electronic device 901 does not turn off the imaging device(s) 908), the start of the video corresponds to the portion of the video that the imaging device(s) 908 were generating right after detecting an event. For example, the start of the video may correspond to the first frame of the video after detecting the event. In other examples, such as when the electronic device 901 does not continuously generate the image data 926 (e.g., the electronic device 901 turns off the imaging device(s) 908 until detecting an event such as a motion event), the start of the video corresponds to the first frame of the video that is generated by the imaging device(s) 908.

As further illustrated in the example of FIG. 10, the electronic device 901 may include the computer-vision component 948. The computer-vision component 948 may be configured to analyze the image data 926 using one or more computer-vision techniques and output computer-vision data 950 based on the analysis. The computer-vision data 950 may represent information, such as the presence of an object represented by the image data 926, the type of object represented by the image data 926, locations of the object relative to the electronic device 901, a direction of movement of the object, a velocity of the object, and/or any other type of information. As described herein, the type of object may include, but is not limited to, a person, an animal (e.g., a dog, a cat, a bird, etc.), a car, a tree, a wall, and/or any other type of object. In some examples, the computer-vision data 950 may further represent a bounding box indicating the respective location of each object represented by the image data 926.

For example, the computer-vision component 948 may analyze the image data 926 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 948 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video.

Clustering technique(s) may partition an image into a number of clusters (e.g., portions). For instance, the clustering technique(s) may pick a number of cluster centers, either randomly or based on some heuristic method. The clustering technique(s) may then assign each pixel in the image to the cluster that minimizes the distance between the pixel and the cluster center. Next, the clustering technique(s) may re-compute the cluster centers by averaging all of the pixels in the cluster. These steps may be repeated until a convergence is attained, which is when no pixel changes clusters.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 446 may use object detection technique(s) that use computer-vision analysis to perform informative region selection, features extraction, and then classification of object(s) represented by the image data 926. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

The electronic device 901 may also store command data 956. In some circumstances, a user of the electronic device 901 may want to receive a live view from the electronic device 901. The command data 956 may represent an identifier associated with the electronic device 901, a command to generate the image data 926, a command to send the image data 926, and/or the like. In some examples, the electronic device 901 may then analyze the command data 956 and, based on the identifier, determine that the command data 956 is directed to the electronic device 901. For example, the electronic device 901 may match the identifier represented by the command data 956 to an identifier associated with, and stored by, the electronic device 901. Additionally, the electronic device 901 may cause the imaging device(s) 908 to begin generating the image data 926 (e.g., if the imaging device(s) 908 are not already generating the image data 926) and send the image data 926 to the remote system(s) 106, the user device 108, and/or another device.

Electronic device 901 may also store color filter array interpolation data 954 effective to cause processor 903 and/or image signal processor 946 to perform techniques associated with color filter array interpolation system 102. As described above, the color filter array interpolation system 102 (and/or the CFA interpolation 714) may perform CFA interpolation (demosaicing) as described above in reference to FIGS. 1-6 to generate $I_{R,G,B,IR}$ image data for the current frame of image data. The logic and/or circuitry used to implement the color filter array interpolation system 102 may be implemented in the image signal processor 946 (e.g., as described above in reference to FIGS. 7-8, for example). In various other examples, the color filter array interpolation data 954 may be used to implement the color filter array interpolation system 102 as software executing on the image signal processor 946 and/or as some combination of software executing on the image signal processor 946 and hardware included in the circuitry of the image signal processor 946 or one or more different components. Similarly, the color filter array interpolation data 954 may be used to implement color filter array interpolation system 102 as software executing on processor 903 and/or as some combination of hardware and software executing on processor 903. In addition some operations and/or components of color filter array interpolation system 102 may be implemented by processor 903 (as hardware, software, and/or some combination thereof), while other operations and/or components of color filter array interpolation system 102 may be implemented by image signal processor 946 (as hardware, software, and/or some combination thereof). The executable instructions associated with color filter array interpolation data 954, may be stored in memory 922 and/or in one or more separate memories, depending on the desired implementation. The various techniques used to generate $I_{R,G,B,IR}$ image data for a given frame of image data will not be repeated in reference to FIG. 10 for brevity.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Figure 11:
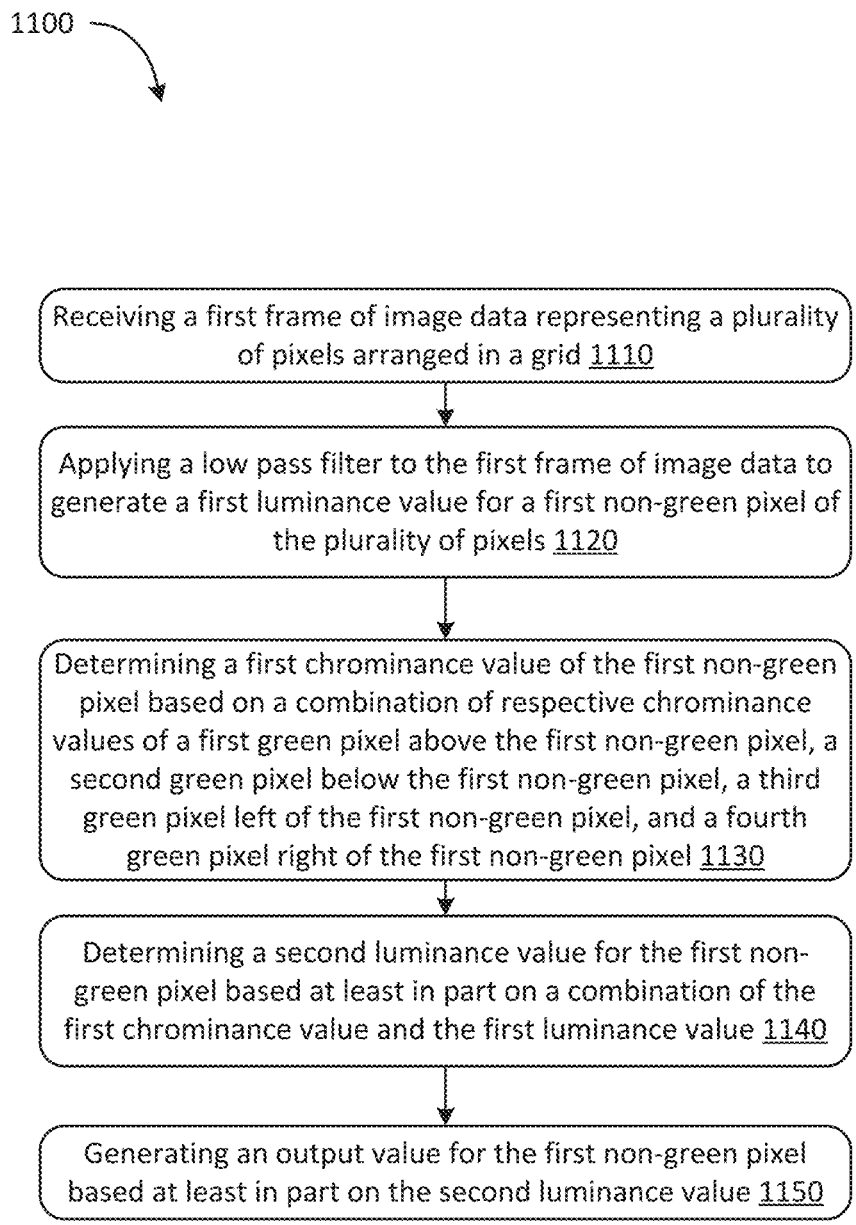
FIG. 11 is a flow diagram illustrating an example process for performing color filter array interpolation, in accordance with various aspects of the present disclosure.

FIG. 11 is a flow diagram illustrating an example process 1100 for performing color filter array interpolation, in accordance with various aspects of the present disclosure. The process 1100 of FIG. 11 may be executed by CFA interpolation system 102. The actions of process 1100 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 1100 may be described above with reference to elements of FIGS. 1-10.

Processing may begin at action 1110, at which a first frame of image data representing a plurality of pixels arranged in a grid may be received. In various examples, each pixel may be tagged with metadata such as metadata indicating a CFA index, an X, Y pixel location (e.g., a coordinate within the first frame of image data), a pixel color (e.g., red, blue, IR, green), etc. Each pixel may be associated with a raw pixel value representing an intensity of light captured by the photosensor that corresponds to that pixel location.

Processing may continue at action 1120, at which a low pass filter may be applied to the first frame of image data to generate a first luminance value for a first non-green pixel of the plurality of pixels. As described above, a low pass filter may be implemented in the spatial domain using a two-dimensional convolutional filter (e.g., low pass convolution filter 802). The low pass filter may be effective to attenuate high frequency information. Since luminance magnitude information in the frequency domain tends to be of low frequency, the output of the low pass filtering operation may be considered an estimate of luminance (L).

Processing may continue at action 1130, at which a first chrominance value of the first non-green pixel may be determined based on a combination of chrominance values of surrounding (e.g., adjacent) green pixels. For example, the first non-green pixel may be located on the grid of pixels of the first frame of image data at a first position. There may be a green pixel located directly above, directly below, directly to the left of, and directly to the right of the first non-green pixel. For example, see the example input image 202 which is a pattern image output by a CFA including red, green, blue, and infrared light filters. As used herein, an "adjacent" pixel shares a side/border with a neighboring pixel. In various examples, the combination of neighboring green pixel chrominance values may be weighted using the techniques described above in reference to FIGS. 4A, 4B. The weights may be calculated using various different convolution filters, as described above.

Processing may continue at action 1140, at which a second luminance value may be determined for the first non-green pixel based at least in part on a combination of the first chrominance value and the first luminance value. For example, after determining a chrominance value for the first non-green pixel at action 1130, the determined chrominance value may be added to the first luminance value L estimated at action 1120 to generate a second luminance value L for the first non-green pixel.

Processing may continue at action 1150, at which an output value may be determined for the first non-green pixel based at least in part on the second luminance value. In various examples, the second luminance value may be filtered using an anti-aliasing filter such as the Quincunx filter. The chrominance for the color channel of the pixel (e.g., blue for a blue pixel) may be determined by subtracting the luminance from the raw pixel value (color difference technique) or by dividing the raw pixel value by the luminance (constant hue prior technique). The chrominance values for each other color channel may be determined using interpolation (e.g., bilinear interpolation). Final R, G, B, and IR values for each pixel may be determined by adding/multiplying the luminance value by the chrominance value for each channel. These final R, G, B, and IR values are generated for each pixel and constitute the output values for each pixel. Accordingly, the output values for the first non-green pixel may include R, G, B, and IR pixel values determined as described above. Addition may be used for the color difference technique, while multiplication may be used for the constant hue prior technique. Bilinear interpolation of chrominance values may lead to interpolation errors (e.g., especially along edges). However, since human visual acuity is relatively non-sensitive to changes in chrominance (relative to luminance), overall image quality is maintained.

Figure 12:
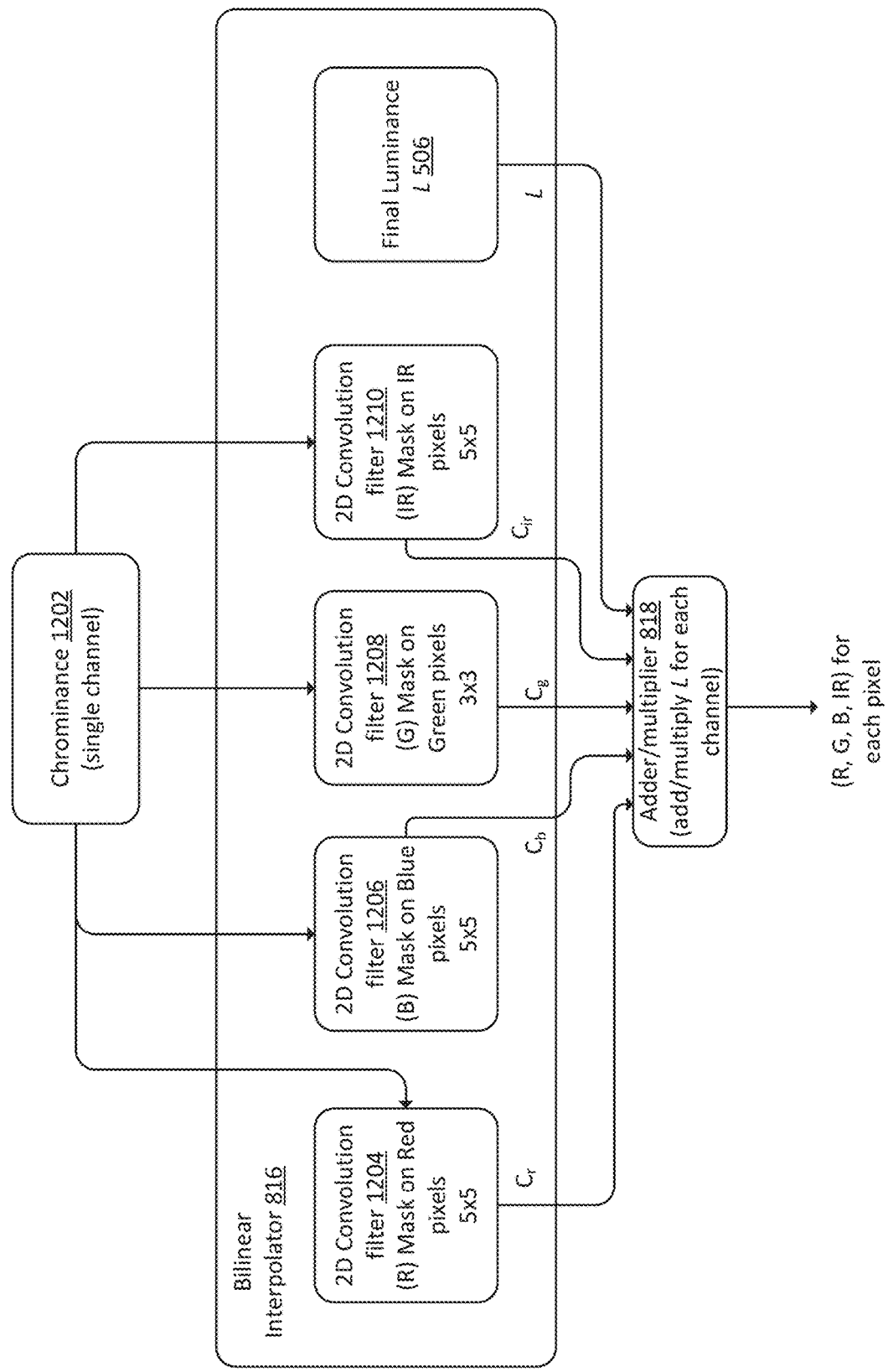
FIG. 12 is a block diagram illustrating an example implementation of a bilinear interpolator, in accordance with various aspects of the present disclosure.

FIG. 12 is a block diagram illustrating an example implementation of bilinear interpolator 816 (e.g., implemented as a bilinear interpolator circuit), in accordance with various aspects of the present disclosure. As previously described, after using the constant hue prior 602 technique or the color difference 604 technique, one chrominance value (for the color channel corresponding to the pixel color) and the luminance value may be known for each pixel after subtractor/divider 814. The single channel chrominance 1202 (e.g., per-pixel C) may be sent to bilinear interpolator 816 which may perform bilinear interpolation to determine the missing chrominance values for each pixel.

As shown in FIG. 12, a separate 2D convolution filtering operation may be performed for each channel (e.g., for red, blue, green, and infrared). In some examples, a single 2D convolution block (e.g., ASIC) may be used with different filter kernels for each different channel. However, in other examples, multiple 2D convolution blocks may be used (as depicted in FIG. 12, for example). The terminology "mask on" pixels indicates that for the given convolution filter, only pixels of the relevant color are considered. Accordingly, a single image frame may be operated on by bilinear interpolator 816 without the need to split the image frame into single color channel frames. However, in other implementations (e.g., image signal processors without pixel taggers), the image frame may be used to generate per-channel frames in order to perform the bilinear interpolation. For example, in 2D convolution filter 1204, only red pixels are considered when performing the convolution. As previously described, pixel tagger 708 may be used to tag each pixel with pixel color metadata. In 2D convolution filter 1206 only blue pixels are considered. In 2D convolution filter 1208 only green pixels are considered. In 2D convolution filter 1210 only IR pixels are considered.

Examples of filter kernels (assuming the input is in the 0-1 range) may be:

Green:

| 0.1250 | 0.2500 | 0.1250 |
|---|---|---|
| 0.2500 | 0.5000 | 0.2500 |
| 0.1250 | 0.2500 | 0.1250 |

Blue and Red:

| 0.1250 | 0.2500 | 0.2500 | 0.2500 | 0.1250 |
|---|---|---|---|---|
| 0.2500 | 0.5000 | 0.5000 | 0.5000 | 0.25000 |
| 0.2500 | 0.5000 | 0.5000 | 0.5000 | 0.25000 |
| 0.2500 | 0.5000 | 0.5000 | 0.5000 | 0.25000 |
| 0.1250 | 0.2500 | 0.2500 | 0.2500 | 0.1250 |

IR:

| 0 | 0.1250 | 0.1250 | 0.1250 | 0 |
|---|---|---|---|---|
| 0.1250 | 0.2500 | 0.2500 | 0.2500 | 0.1250 |
| 0.1250 | 0.2500 | 0.5000 | 0.2500 | 0.1250 |
| 0.1250 | 0.2500 | 0.2500 | 0.2500 | 0.1250 |
| 0 | 0.1250 | 0.1250 | 0.1250 | 0 |

The per-channel chrominance values interpolated by bilinear interpolator 816 (e.g., $C_r$, $C_b$, $C_g$, and $C_{ir}$) may be sent together with the final luminance L 506 to add/multiplier 818 (depending on whether constant hue prior 602 technique or color difference 604 technique is used). The adder/multiplier 818 which may add/multiply the final luminance $L_{final}$ and the chrominance value for each color channel to obtain the output pixel value for each color channel (R, G, B, and IR).

Figure 13:
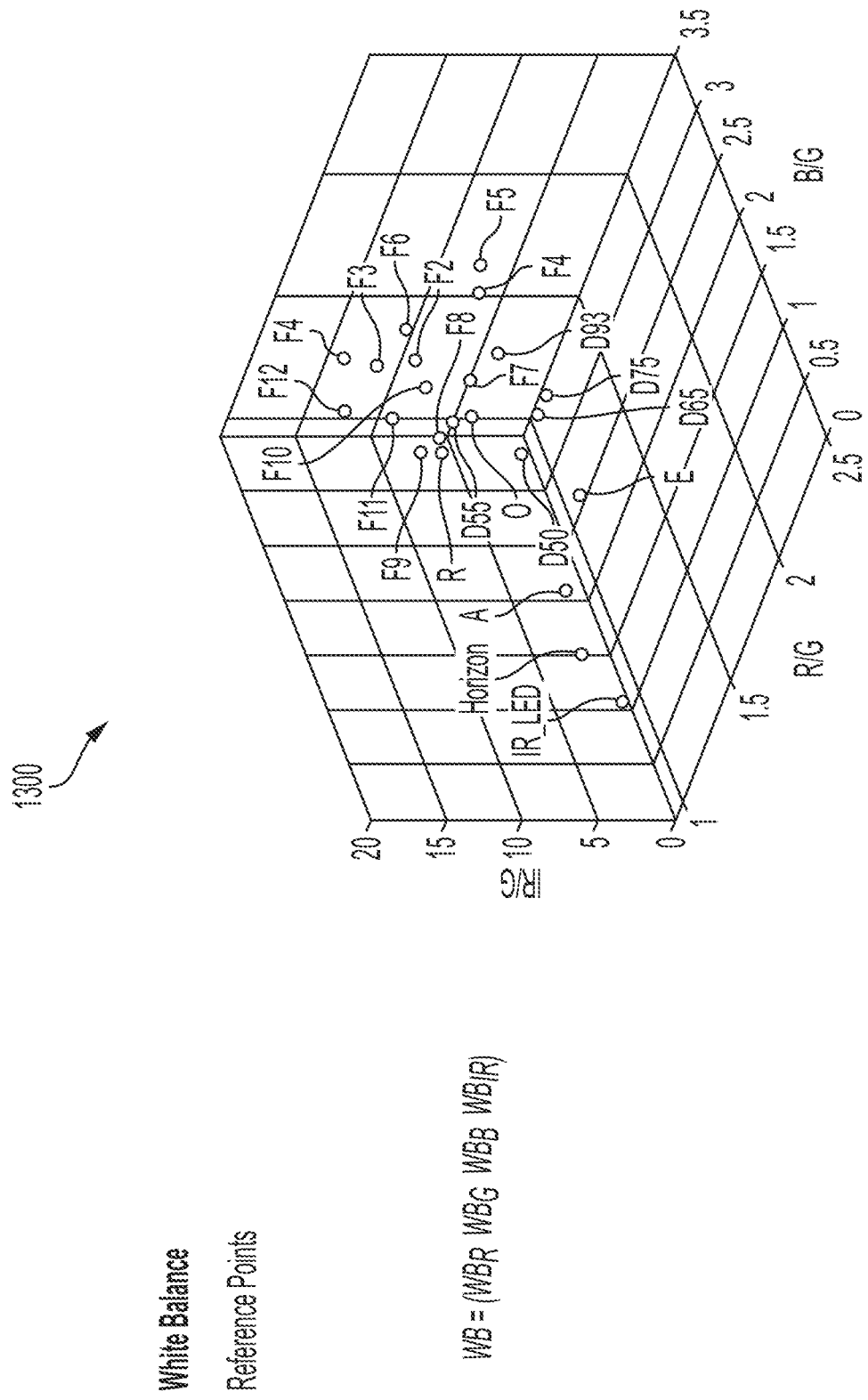
FIG. 13 is a three dimensional graph illustrating automatic white balance and color correction matrix determination for image data, in accordance with various aspects of the present disclosure.

FIG. 13 is a three dimensional graph illustrating automatic white balance and color correction matrix determination for image data, in accordance with various aspects of the present disclosure. Auto-white balance ("AWB") may initially down-sample the input image data (e.g., to a 16×16 pixel frame or some other suitable frame size). The down-sampling may be performed for each color channel separately. Accordingly, following the down-sampling there may be four 16×16 pixel frames (or some other suitable size), one frame for each color channel. Additionally, a frame that denotes saturated pixel regions may be generated (often referred to as a "saturation map"). Accordingly, AWB statistics may be of 5×16×16 size (where 5=4 color channels (R, G, B, IR)+1 saturation map). AWB uses the pixel statistics from non-saturated regions in the image to estimate the illuminant present in the scene. Illuminant can be identified using R/G, B/G, and IR/G channel ratios. Using these estimated ratios, the AWB algorithm finds the closest (e.g., the two or three closest) reference points from the image sensor calibration data.

As shown in the 3D graph 1300 in FIG. 13, the axes represent the R/G, B/G, and IR/G ratios. Each point in the 3D graph 1300 represents a pair of white balance gains (e.g., a 1×4 vector with gains for each channel (R, G, B, IR)) and a CCM matrix (e.g., a 3×4 matrix as described above in reference to FIG. 7 and color correction component 720). The final white balance gains to be used by white balance component 718 and CCM to be used by color correction component 720 may be determined by interpolating between the two or three closest reference points in the 3D graph 1300.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A system comprising:
   at least one buffer configured to receive first image data from an image sensor having a plurality of pixels arranged in a grid, the image sensor being overlaid with a color filter array (CFA), the first image data comprising a respective pixel value for each pixel of the plurality of pixels, wherein each pixel value is associated with a red light filter of the CFA, a blue light filter of the CFA, a green light filter of the CFA, or an infra-red (IR) light filter of the CFA;
   a color filter array interpolation circuit component configured to generate, for a first pixel having a first pixel value, first coordinate data identifying a location associated with the first pixel in the grid and first pixel color data labeling the first pixel value as a red pixel, a blue pixel, or an IR pixel;
   a first convolution filter effective to determine, for the first pixel, a first luminance value by convolving the first pixel value and pixel values of at least two pixels adjacent to the first pixel;
   a first non-linear filter effective to determine, for the first pixel, a first chrominance value of a first color channel by combining chrominance values of the at least two green pixels adjacent to the first pixel;
   a first adder circuit configured to add the first luminance value to the first chrominance value to determine a second luminance value;
   a second adder circuit configured to generate a second pixel value for the first color channel of the first pixel by adding the second luminance value and the first chrominance value;
   a multiplier circuit effective to multiply a first output pixel value by a multiplier associated with a CFA index of the first pixel to generate a second output pixel value; and
   the at least one buffer further effective to store the second output pixel value.

2. The system of claim 1, further comprising:
   a color filter array interpolation circuit configured to perform bilinear interpolation to generate, for the first pixel, a second chrominance value of a second color channel by interpolating chrominance values of the second color channel for pixels adjacent to the first pixel;
   wherein the second adder circuit is further configured to generate a second pixel value for the second color channel by adding the second luminance value to the second chrominance value.

3. The system of claim 1, further comprising:
   a gamma correction component effective to perform a lookup using the output pixel value to determine a gamma corrected output pixel value for the first color channel, wherein the buffer stores the gamma corrected output pixel value.

4. An integrated circuit comprising:
   a first interface configured to receive first image data from an image sensor, the first image data representing a plurality of pixels and comprising a respective pixel value for each pixel of the plurality of pixels;
   a pixel tagger circuit configured to determine, for a first pixel having a first pixel value, first coordinate data identifying a location associated with the first pixel and first pixel color data;
   a color filter array interpolation circuit configured to:
     determine, for the first pixel, a first chrominance value using a combination of at least a pixel value of a second pixel and a pixel value of a third pixel, wherein the second pixel and the third pixel are associated with second pixel color data labeling the second pixel and the third pixel as green pixels;
     combine the first chrominance value with a first luminance value to generate a second luminance value for the first pixel, wherein the first luminance value is associated with the first pixel; and
     determine output values for the first pixel based at least in part on the second luminance value; and
   a buffer effective to store the output values for the first pixel.

5. The circuit of claim 4, the color filter array interpolation circuit comprising:
   a convolution circuit effective to perform a convolution operation on each pixel of the plurality of pixels to determine a respective estimated luminance value for each pixel of the plurality of pixels.

6. The circuit of claim 5, the color filter array interpolation circuit comprising:
   a subtractor circuit effective to subtract an estimated luminance value of a first green pixel from a raw pixel value of the first green pixel to determine a chrominance value for a green color channel for the first green pixel, wherein the first green pixel is located adjacent to the first pixel.

7. The circuit of claim 4, the color filter array interpolation circuit comprising:
   a first non-linear filter circuit effective to determine a set of weights for the first pixel using at least a raw pixel value of the second pixel and a raw pixel value of the third pixel.

8. The circuit of claim 7, the color filter array interpolation circuit comprising:
   a second non-linear filter circuit effective to determine the first chrominance value using the combination of at least the pixel value of the second pixel and the pixel value of the third pixel, wherein the pixel value of the second pixel is weighted using a first weight of the set of weights and the pixel value of the third pixel is weighted using a second weight of the set of weights.

9. The circuit of claim 4, wherein the first pixel color data labels the first pixel as a red pixel and wherein the first chrominance value is a chrominance value for a red channel, the color filter array interpolation circuit further comprising:
a bilinear interpolator circuit configured to determine a chrominance value of an infrared channel for the first pixel by bilinearly interpolating the chrominance value of at least a second pixel and a third pixel, wherein the second pixel and the third pixel are associated with pixel color data labeling the second pixel and the third pixel as infrared pixels, wherein the second pixel and the third pixel are the closest infrared pixels to the first pixel.

10. The circuit of claim 9, the color filter array interpolation circuit further comprising:
an adder circuit effective to add the second luminance value to the chrominance value of a blue channel to determine a value for the blue channel for the first pixel, wherein the output values comprise the value for the blue channel.

11. The circuit of claim 9, the color filter array interpolation circuit further comprising:
a multiplier circuit effective to multiply the second luminance value by the chrominance value of the blue channel to determine a value for the blue channel for the first pixel, wherein the output values comprise the value for the blue channel.

12. The circuit of claim 4, further comprising:
a color correction circuit that takes as input a first red channel value $R_1$, a first green channel value $G_1$, a first blue channel value $B_1$, and an infra-red channel value IR and performs a matrix multiplication with a 4×3 color correction matrix to output a second red channel value $R_2$, a second green channel value $G_2$, and a second blue channel value $B_2$.

13. A method comprising:
receiving, at a first interface, first image data from an image sensor, the first image data representing a plurality of pixels and comprising a respective pixel value for each pixel of the plurality of pixels;
generating, by a pixel tagger circuit for a first pixel having a first pixel value, first coordinate data identifying a location associated with the first pixel and first pixel color data;
determining, by a color filter array interpolation circuit for the first pixel, a first chrominance value using a combination of at least a first pixel value of a first pixel and a second pixel value of a second pixel, wherein the first pixel and the second pixel are associated with second pixel color data labeling the first pixel and the second pixel as green pixels;
combining, by the color filter array interpolation circuit, the first chrominance value with a first luminance value to generate a second luminance value for the first pixel, wherein the first luminance value is associated with the first pixel;
determining, by the color filter array interpolation circuit, output values for the first pixel based at least in part on the second luminance value; and
storing the output values for the first pixel in a buffer.

14. The method of claim 13, further comprising:
performing, by the color filter array interpolation circuit, a convolution operation on each pixel of the plurality of pixels to determine a respective estimated luminance value for each pixel of the plurality of pixels.

15. The method of claim 14, further comprising:
subtracting, by a subtractor circuit of the color filter array interpolation circuit, an estimated luminance value of a first green pixel from a raw pixel value of the first green pixel to determine a chrominance value for a green color channel for the first green pixel, wherein the first green pixel is located adjacent to the first pixel.

16. The method of claim 13, further comprising:
determining, by a first non-linear filter circuit, a set of weights for the first pixel based at least in part on a raw pixel value of the second pixel and a raw pixel value of a third pixel.

17. The method of claim 16, further comprising:
determining, by a second non-linear filter component, the first chrominance value using the combination of at least the pixel value of the second pixel and the pixel value of the third pixel, wherein the pixel value of the second pixel is weighted using a first weight of the set of weights and the pixel value of the third pixel is weighted using a second weight of the set of weights.

18. A device comprising:
a lens;
an image sensor;
a color filter array;
non-transitory computer-readable memory; and
an image signal processor configured in communication with the non-transitory computer-readable memory, the image signal processor comprising:
a first interface configured to receive first image data from the image sensor, the first image data representing a plurality of pixels and comprising a respective pixel value for each pixel of the plurality of pixels;
a pixel tagger circuit configured to determine, for a first pixel having a first pixel value, first coordinate data identifying a location associated with the first pixel and first pixel color data; and
a color filter array interpolation circuit configured to:
determine, for the first pixel, a first chrominance value using a combination of at least a pixel value of a second pixel and a pixel value of a third pixel, wherein the second pixel and the third pixel are associated with second pixel color data labeling the second pixel and the third pixel as green pixels;
combine the first chrominance value with a first luminance value to generate a second luminance value for the first pixel, wherein the first luminance value is associated with the first pixel; and
determine output values for the first pixel based at least in part on the second luminance value.

19. The device of claim 18, the color filter array comprising:
first rows, wherein each first row includes alternating red light filters and blue light filters with at least one green light filter interposed between each red light filter and blue light filter; and
second rows, wherein each second row includes alternating infrared light filters and green light filters with at least one green light filter being interposed between any two infrared light filters.

20. The device of claim 18, the color filter array interpolation circuit comprising:
a convolution circuit effective to perform a convolution operation on each pixel of the plurality of pixels to determine a respective estimated luminance value for each pixel of the plurality of pixels.

21. The device of claim 18, the color filter array interpolation circuit comprising:
a subtractor circuit effective to subtract an estimated luminance value of a first green pixel from a raw pixel value of the first green pixel to determine a chrominance value for a green color channel for the first green pixel, wherein the first green pixel is located adjacent to the first pixel.

22. The device of claim 18, wherein the first pixel color data labels the first pixel as a red pixel and wherein the first chrominance value is a chrominance value for a red channel, the color filter array interpolation circuit comprising:
a bilinear interpolator circuit configured to determine a chrominance value of an infrared channel for the first pixel by bilinearly interpolating the chrominance value of at least a second pixel and a third pixel, wherein the second pixel and the third pixel are associated with pixel color data labeling the second pixel and the third pixel as infrared pixels, wherein the second pixel and the third pixel are the closest infrared pixels to the first pixel.

\* \* \* \* \*